United States Patent
Anthony et al.

(10) Patent No.: US 6,425,632 B1
(45) Date of Patent: Jul. 30, 2002

(54) RESTRAINT WITH A WEB ADJUSTER AND COUPLING

(75) Inventors: James T. Anthony, Noblesville; Harold L. Forth, Fortville; Guy R. Dingman, Elwood; Steven T. Berenyi, Indianapolis, all of IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 0 days.

(21) Appl. No.: 09/472,258

(22) Filed: Dec. 27, 1999

Related U.S. Application Data

(63) Continuation-in-part of application No. 09/135,908, filed on Aug. 18, 1998, now Pat. No. 6,017,087.

(51) Int. Cl.⁷ .................................................. A47D 1/10
(52) U.S. Cl. ....................... 297/250.1; 297/253; 24/171
(58) Field of Search ............................. 297/250.1, 253; 24/171

(56) References Cited

U.S. PATENT DOCUMENTS

| | | | |
|---|---|---|---|
| 3,414,947 A | 12/1968 | Holmberg et al. ............ 24/196 |
| 3,540,091 A | 11/1970 | Marosy | |
| 4,184,234 A | 1/1980 | Anthony et al. .............. 24/196 |
| 4,876,770 A | 10/1989 | Bougher ...................... 24/170 |
| 4,919,484 A | 4/1990 | Bougher et al. | |
| 5,487,588 A | 1/1996 | Burleigh et al. | |
| 5,669,663 A | 9/1997 | Feuerherdt .................. 297/253 |
| 5,695,243 A | 12/1997 | Anthony et al. | |
| 5,779,319 A | 7/1998 | Merrick ...................... 297/484 |
| 5,890,762 A | 4/1999 | Yoshida .................. 297/256.13 |
| 5,979,982 A | * 11/1999 | Nakagawa ............... 297/250.1 |
| 6,209,957 B1 | * 4/2001 | Baloga et al. .............. 297/253 |

FOREIGN PATENT DOCUMENTS

| EP | 0 619 202 | 3/1994 | |
| EP | 619201 | 10/1994 | ............. 297/250.1 |

* cited by examiner

Primary Examiner—Anthony D. Barfield
(74) Attorney, Agent, or Firm—Barnes & Thornburg

(57) ABSTRACT

A coupling and web adjuster to attach an infant seat to the passenger seat of a vehicle having a fixedly mounted rigid member to which the seat may be attached. The web adjuster has a cylindrical bar with a generally oval cross-section and a pair of ears mounted near each of its ends; a web that extends at least partially around the bar, a frame with a pair of channels in which the ears of the bar may slide, and one or more mechanical springs to normally push the bar toward the web stop and against the web. One version of the coupling is characterized by a frame having a notch on its distal end with a mouth/seat that is adapted to receive the fixedly mounted rigid member and a lever that is pivotally mounted inside the frame to hold the rigid member inside the mouth. The lever has a downwardly projecting finger that blocks the mouth of the notch when moved in one direction and allows access to the notch when moved in the other direction. Another version of the coupling is characterized by a rigid hollow cylinder with two notches in one end, a piston that slides back and forth inside the cylinder, a spring to push the piston toward the notches; and a means to prevent the piston from sliding out of the cylinder. Either coupling may then incorporate the first described web adjuster to attach the coupling to the child seat.

17 Claims, 22 Drawing Sheets

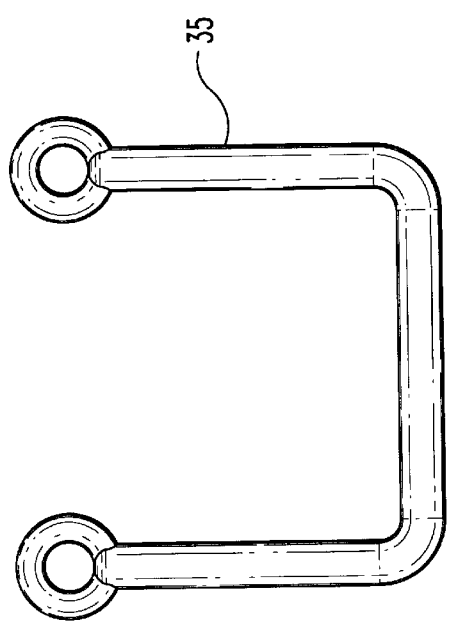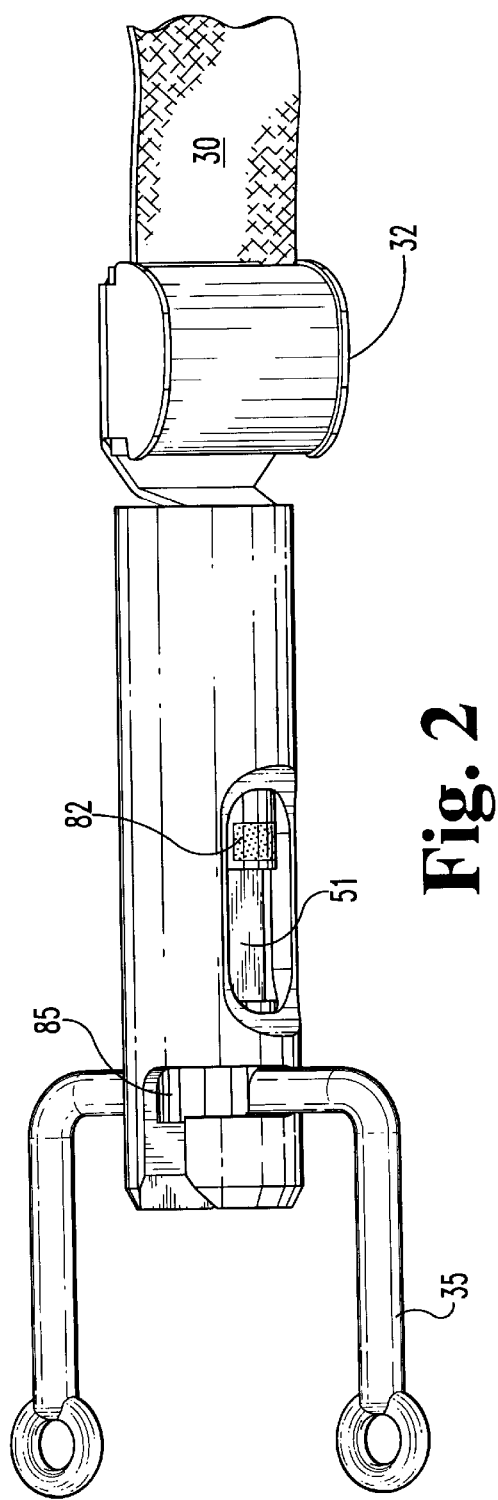

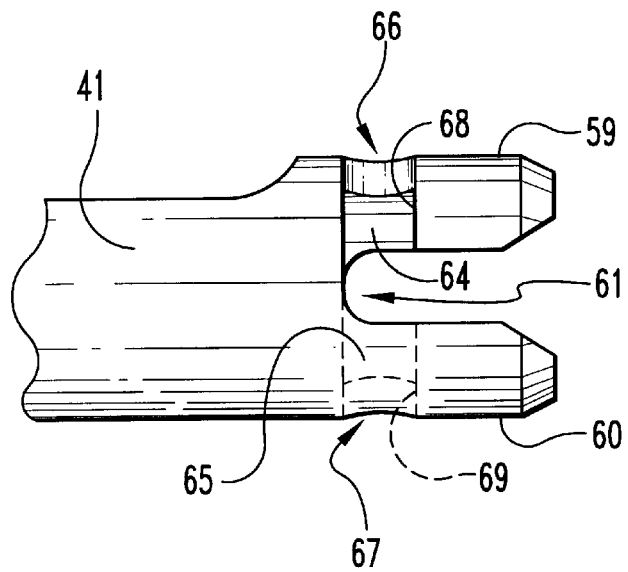
Fig. 5
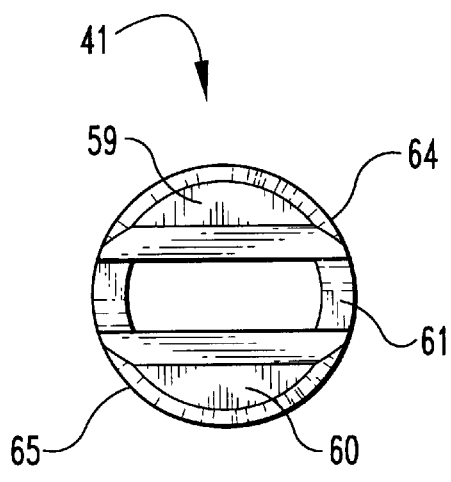 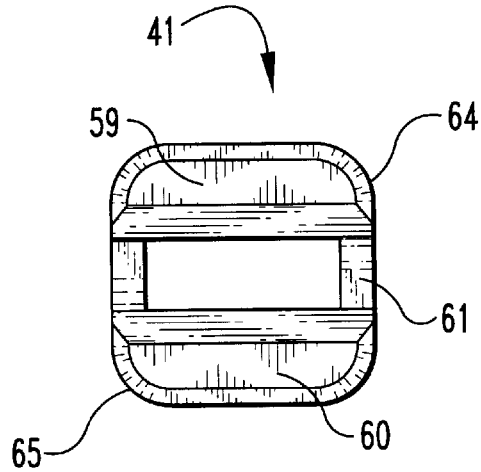
Fig. 6　　　　Fig. 7

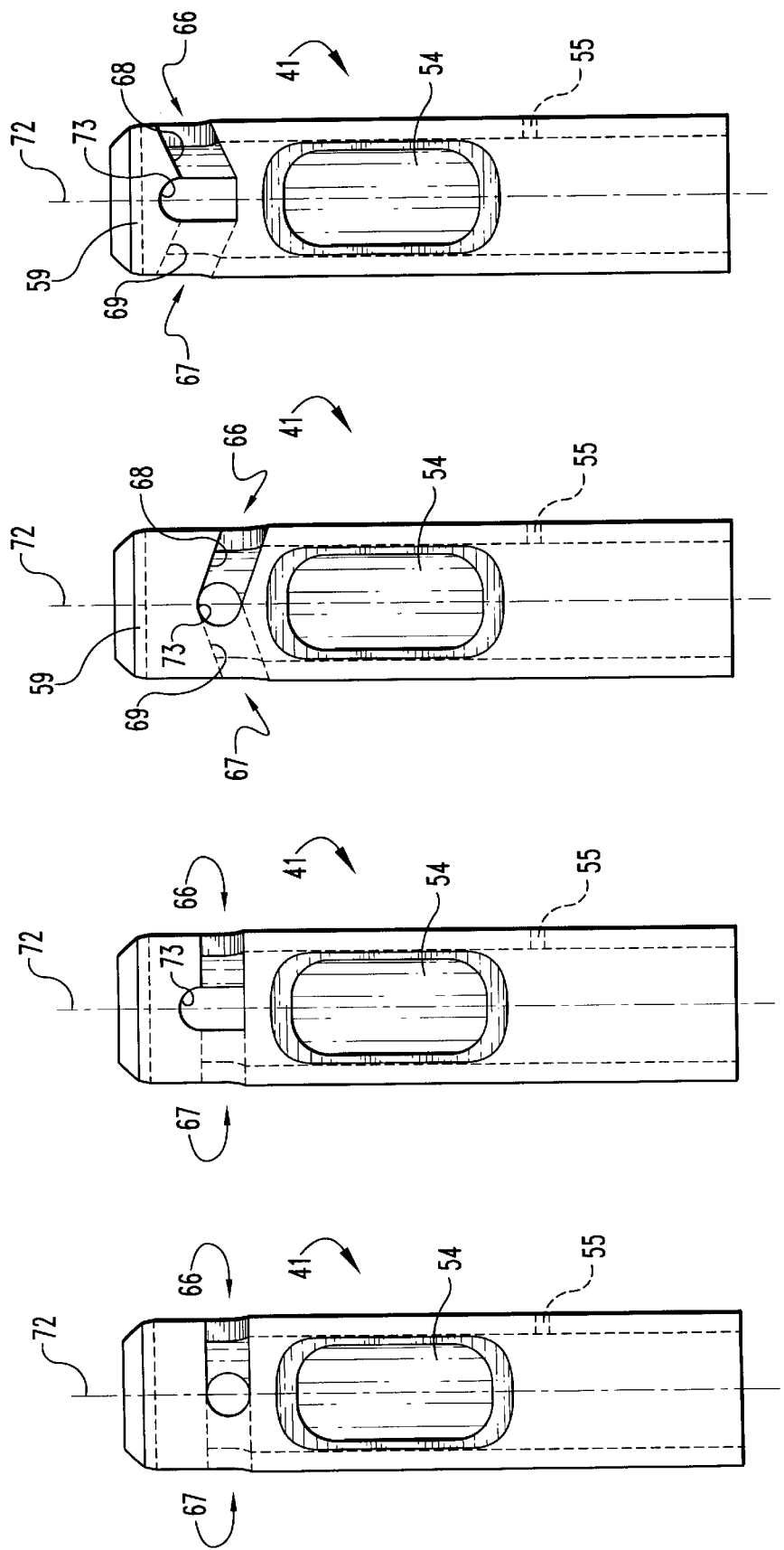

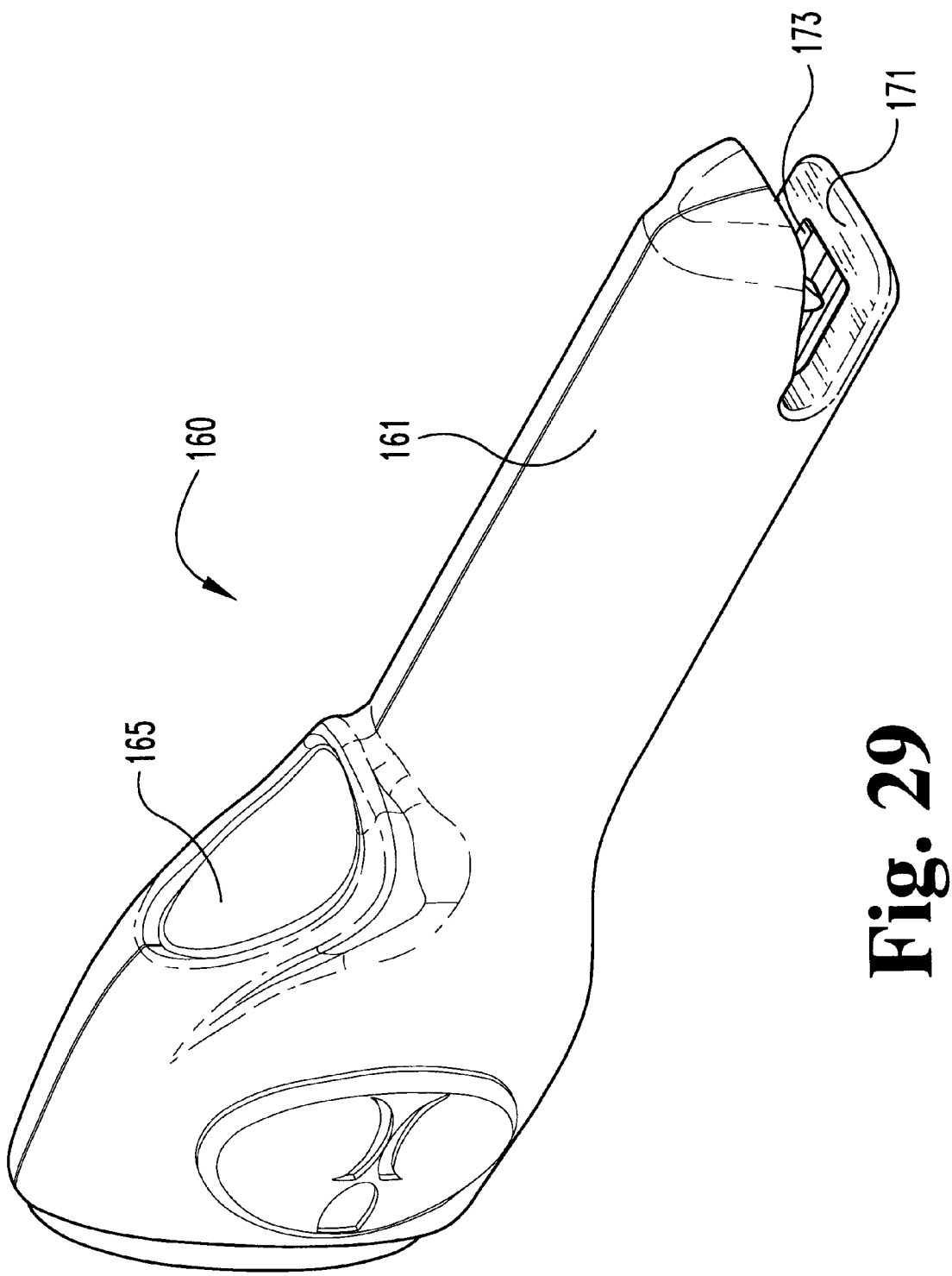

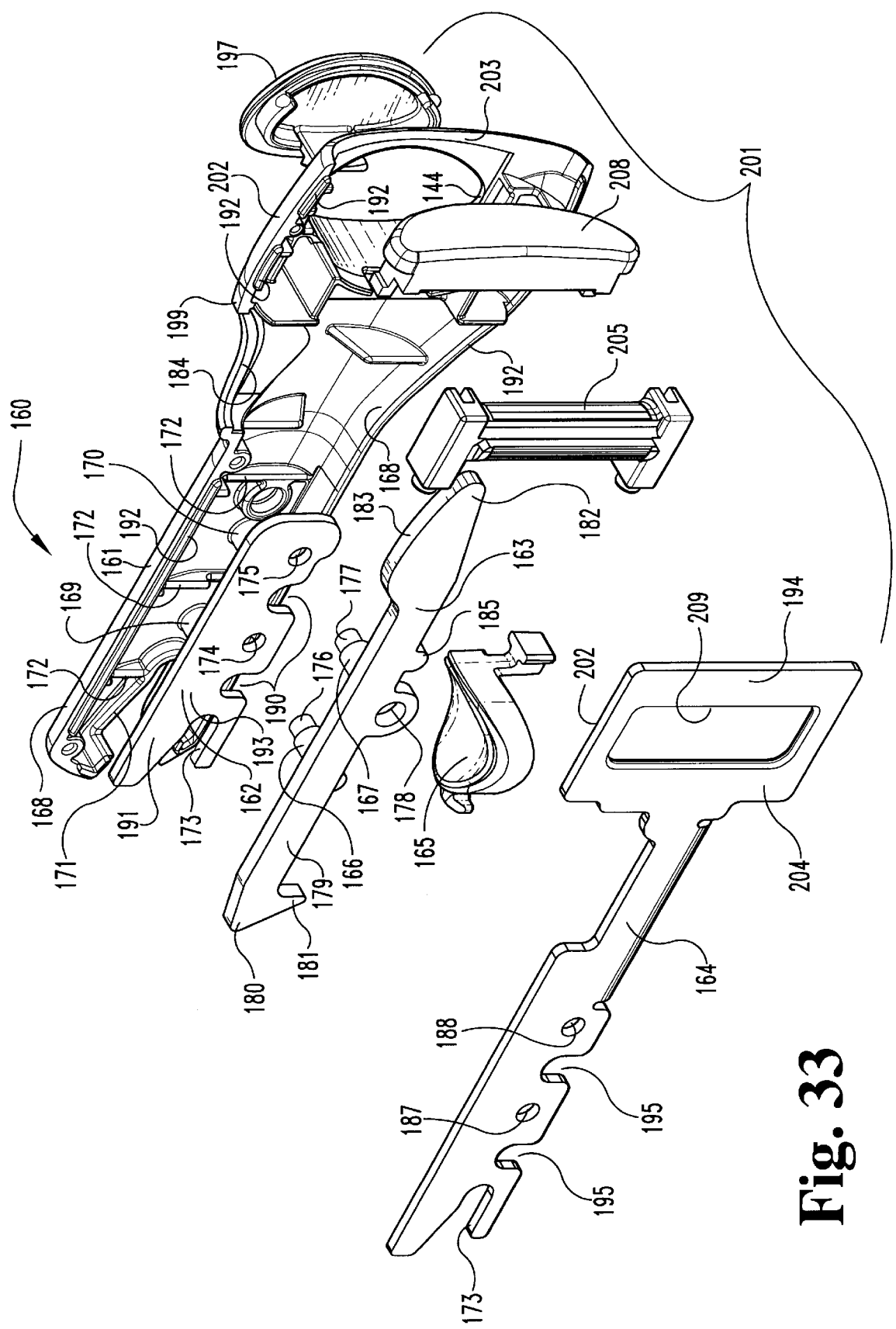

RESTRAINT WITH A WEB ADJUSTER AND COUPLING

This application is a continuation-in-part of application Ser. No. 09/135,908 filed, Aug. 18, 1998 now U.S. Pat. No. 6,017,087.

This invention relates to connections that secure a child's seat to the passenger seat of a vehicle.

BACKGROUND OF THE INVENTION

Often when small children ride in an automobile, they are placed in a child seat, which is placed upon the seat of the automobile. The child seat normally includes a set of seat belts, which secure the child. The child seat is, in turn, normally secured to the automobile in some fashion utilizing the seat belts, which are permanently attached inside the vehicle. But the standard seat belts for an automobile are designed to secure an adult to the seat of an automobile, rather than a child seat. Consequently, the child seat must be deigned to accommodate being secured to the automobile with any of several different types of restraining means available in differing automobiles. These include but are not limited to lap belts, shoulder belts, combined lap and shoulder belts, and the like.

Accordingly, what is needed is a child seat that is designed to integrate directly to fastening devices mounted to the passenger seat that are separate from the normal passenger restraint system. One answer to this need can be found in commonly owned U.S. Pat. No. 5,695,243 to Anthony et al., the disclosure of which is specifically incorporated into this specification by reference. The present invention is another answer.

SUMMARY OF THE INVENTION

In one aspect, this invention is a web adjuster to use in a seat belt device. This web adjuster has a cylindrical bar with a generally oval to round cross-section and a pair of ears mounted near each of its ends that are crosswise to its longitudinal axis; a web extending at least partially around the bar, a frame with a pair of channels in which the ears of the bar may slide, and one or more mechanical springs to normally push the bar toward the web stop and against the web.

In another aspect, this invention is a child restraining device for mounting in the passenger seat of a vehicle that has at least one rigid member fixedly mounted in the bite between the passenger seat's seat portion and back portion. In particular, the child restraining device of this invention has a child seat and at least one coupling to attach the child seat to the rigid member. The coupling is characterized by a frame having a notch on its distal end with a mouth/seat that is adapted to receive the fixedly mounted rigid member and a lever that is pivotally mounted inside the frame to hold the rigid member inside the mouth. The lever has a downwardly projecting finger that blocks the mouth of the notch when moved in one direction and allows access to the mouth when moved in the other direction. The coupling is further characterized by a biasing means to hold the coupling in a normally closed position and a means, such as the above-described web adjuster, for securing the coupling to the child seat.

In yet another aspect, this invention is a child-restraining device for mounting in the passenger seat of a vehicle that has at least one rigid member fixedly mounted in the bite between the passenger seat's seat portion and back portion. In particular, the child-restraining device of this invention has a child seat and at least one rotary coupling to attach the child seat to the rigid member. The rotary coupling is characterized by a rigid hollow cylinder with two notches in one end, a piston that slides back and forth inside the cylinder, a spring to push the piston toward the notches; a means to prevent the piston from sliding out of the cylinder, and a means, such as the above-described web adjuster, for securing the rotary coupling to the child seat.

BRIEF DESCRIPTION OF THE DRAWINGS

FIG. 2 is an enlarged perspective view of a rotary coupling attached to a fixedly mounted rigid member according to one embodiment of the present invention.

FIG. 3 is a plan view of a fixedly mountable rigid member.

FIG. 5 is a side view of the distal end of a rotary coupling according to one embodiment of the present invention.

FIG. 6 is an end view of the distal end of a rotary coupling according to one embodiment of the present invention.

FIG. 7 is an end view of the distal end of a rotary coupling according to one embodiment of the present invention.

FIGS. 8, 9, 10, and 11 are plan views alternative embodiments of a cylinder that may be used in a rotary coupling according to the present invention.

FIGS. 29–32 are respectively perspective, top, side, and end views of a connector according to one embodiment of the present invention.

FIG. 33 is an exploded view of a connector according to one embodiment of the present invention.

DESCRIPTION OF THE PREFERRED EMBODIMENTS

Figure 1:
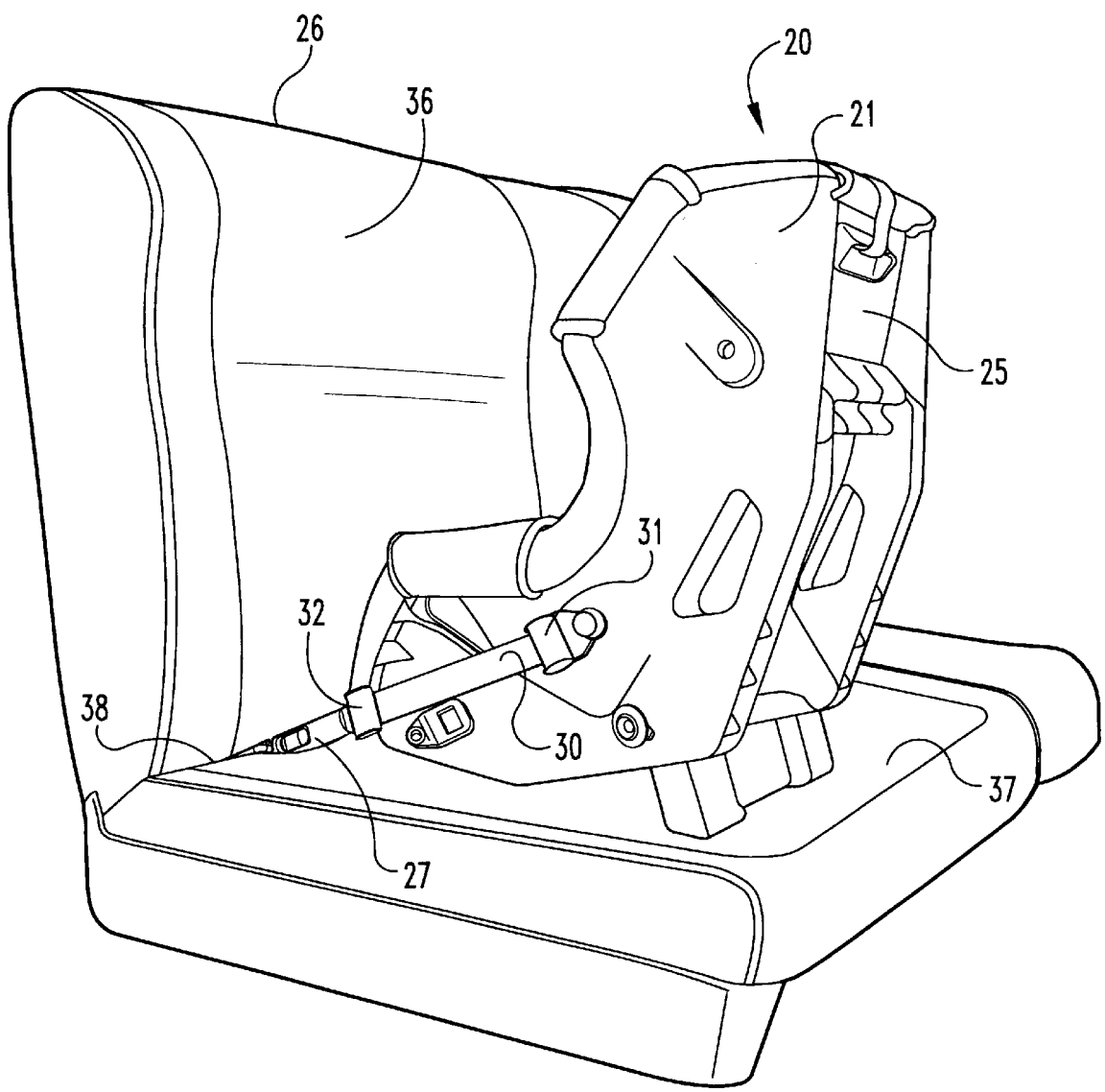
FIG. 1 is a perspective view of a passenger seat and a rearwardly facing child seat incorporating one embodiment of the present invention.

For the purpose of promoting an understanding of the principles of this invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein are contemplated as would normally occur to one of average skill in the art to which the invention relates.

Referring to FIG. 1, child's infant seat 20 is shown placed on top of automobile seat 26. Seat 20 includes a plastic main body 21 that is molded to receive a child in the sitting position. The seat portion is generally concave in configuration and is integrally joined to back portion 25. For the child's comfort, a flexible and washable cushion preferably resides over both the seat and back portions.

Seat 20 is coupled by one, or alternatively at least two, rotary coupling(s) 27 to passenger seat 26 with a separate web or belt 30 tying or securing each coupling to seat 20. For clarity, only one rotary coupling 27 is shown in FIG. 1. However, a second coupling, similar to the one that is shown, can be mounted on the other side of seat 20. The proximal end of web 30 includes a conventional web adjuster 31 that is mounted, optionally with a pivot, to seat 20. An example of such a web adjuster is described in U.S. Pat. No. 4,660,889 to Anthony et al., U.S. Pat. No. 5,031,962 to Lee, or U.S. Pat. No. 4,876,770 to Bougher, the disclosures of which are specifically incorporated into the specification by reference. The distal end of web or belt 30 is then attached to the proximal end of rotary coupling 27 in any conventional manner, such as with pins, rivets, stitching, or another web adjuster 32. If web adjuster 32 is used, one may omit web adjuster 31 and mount the proximal end of web 30 directly to seat 20. Upon attachment to seat 20, web adjuster 31 may then be used to adjust the tension or tightness of web 30 when seat 20 is attached to passenger seat 26.

A closer view of rotary coupling 27 engaged to a fixedly mountable rigid member 35 is shown in FIG. 2. Referring back to FIG. 1, fixedly mountable rigid member 35 (not shown) can be mounted in most any conventional manner to passenger seat 26 in bite 38 between back support 36 and seat support 37. In general, at least one rigid member 35 is mounted in seat bite 38 for every rotary coupling 27 that is used to attach infant seat 20 to passenger seat 26, generally one on each side of seat 20. And referring to FIG. 3, rigid member 35 is typically round in cross-section of which one example is an Anchorage World Universal 6-millimeter bar.

Figure 4:
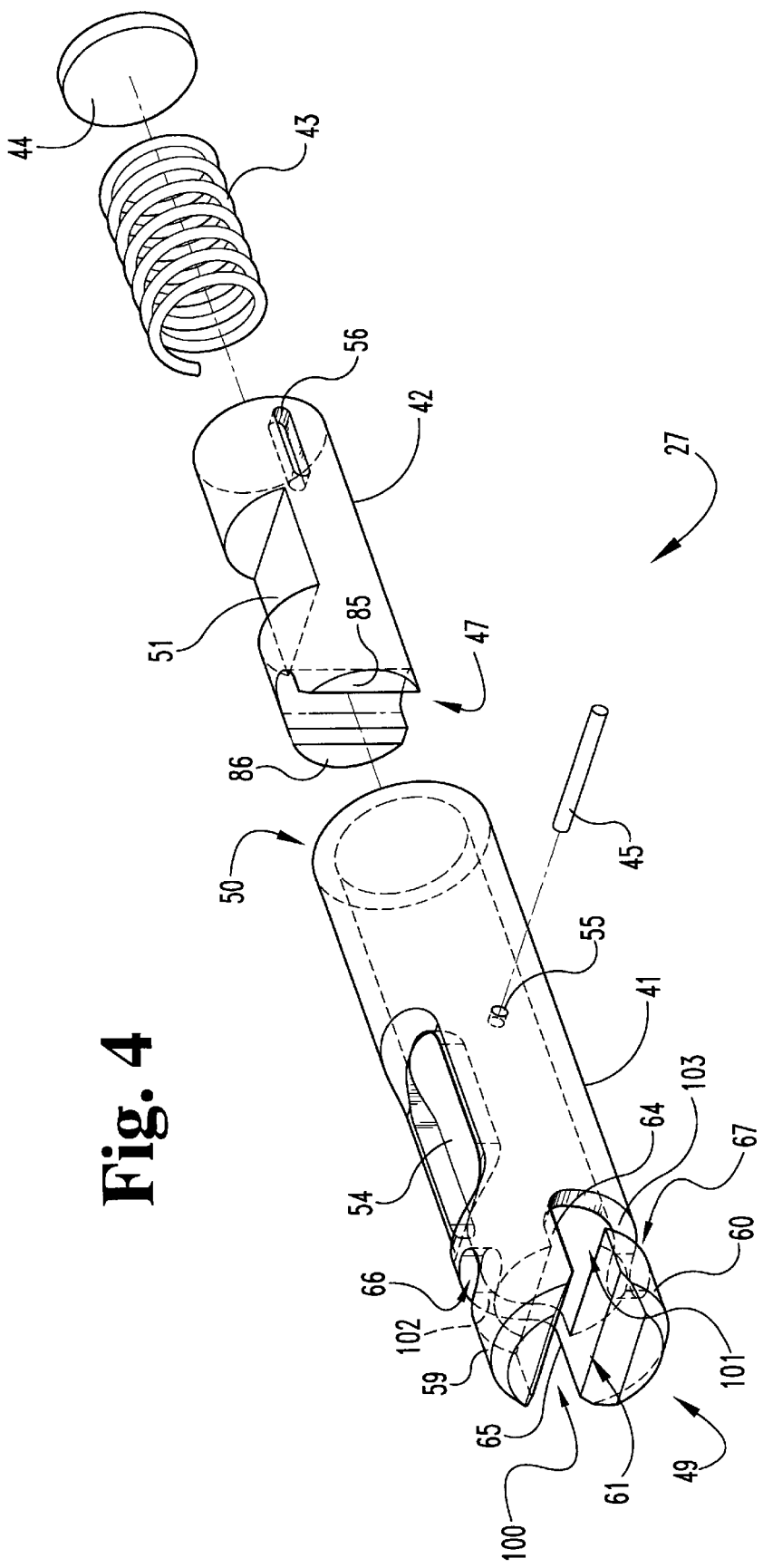
FIG. 4 is an exploded view of a rotary coupling according to one embodiment of the present invention.

An exploded view of rotary coupling 27 is presented in FIG. 4. Rotary coupling 27 generally includes rigid hollow cylinder 41, piston 42, spring 43, end 44, and pin 45. Rotary coupling 27 is assembled by sliding piston 42, external end 47 first, inside rigid hollow cylinder 41. Once inside, piston 42 has sufficient clearance to allow it to reciprocally slide inside rigid hollow cylinder 41, between distal end 49 and proximal end 50. Piston 42 further includes a finger groove 51, which is aligned with access opening 54 and which is adapted to receive a human finger. Finger groove 51 is then maintained in alignment with access opening 54 by pin 45 that extends through hole 55 and into guide groove 56. A spring 43 or other biasing means is then placed behind piston 42 to urge piston 42 toward the distal end 49. Thereafter, end 44 is placed behind spring 43 to hold both spring 43 and piston 42 in position. End 44 can be attached to rigid hollow cylinder 41 in most any conventional fashion, for example, as by welding end 44 to cylinder 41.

Optionally and once the rotary coupling is assembled, a raised button (not shown) adapted to receive a human finger can be attached to piston 42 through access opening 54, over finger groove 51. The raised button can then be used to both manually slide piston 42 inside cylinder 41 and maintain piston 42 in alignment with rigid cylinder 42 by sliding against the sides of access opening 54. Accordingly if the raised button is present, one may omit pin 45 and alignment groove 56 from the rotary coupling shown in FIG. 4.

A side view of distal end 49 on rigid hollow cylinder 41 is presented in FIG. 5 and an end view of distal end 49 is presented in FIG. 6. Simultaneously viewing these figures and FIG. 4, two fingers, 59 and 60, are laterally attached by their opposite proximal ends, 64 and 65, across the open end 61 of cylinder 41. Fingers 59 and 60 are attached slightly spaced from open end 61, which forms notches, 66 and 67, between the proximal edge of each finger, 68 and 69, and open end 61. Notches 66 and 67 are mutually opposed and include respectively slots 100 and 101 extending in the direction of the longitudinal axis of cylinder 41. Slots 100 and 101 open respectively into slots 102 and 103 extending around the cylinder's longitudinal axis. As presented below, fingers 59 and 60 and notches 66 and 67, are generally used to attach the rotary coupling to fixedly mounted member 35. However, if fingers 59 and 60 are optionally mounted over open end 61 as shown, fingers 59 or 60 can also serve to hold piston 42 inside a the rotary coupling when the coupling is not engaged to a fixedly mounted member 35 since the wall thickness 104 of fingers 59 and 60 is greater than the wall thickness of cylinder 41.

FIG. 7 presents an alternative embodiment of rigid hollow cylinder 41. Besides the circular cross-section shown in FIG. 6, cylinder 41 and piston 42 may also be generally square, as shown, as well as have other non-circular cross-sections such as hexagonal, octagonal, or even oval. And should the practitioner choose a non-circular cross-section, the practitioner may again remove pin 45 and groove 56 from coupling 27. Being non-circular, the mating sides of cylinder 41 and a complementarily shaped piston 42 may be used to maintain cylinder 41 and piston 42 in proper alignment.

FIG. 8 presents a plan view of rigid hollow cylinder 41 as shown in previous figures with notches 66 and 67 that are generally perpendicular to longitudinal axis 72. However besides perpendicular, the notches may also take other forms. For example and referring to FIG. 9, notches 66 and 67 may also include a seat 73 that is adapted to receive rigid member 35, when rotary coupling 27 is engaged to rigid member 35. Or referring to FIGS. 10 and 11, the proximal edges, 68 and 69, of fingers 59 and 60 may also be oriented at an oblique angle to longitudinal axis 72, which similarly offers a seat 73 against which rigid member 35 may reside.

Figure 12:
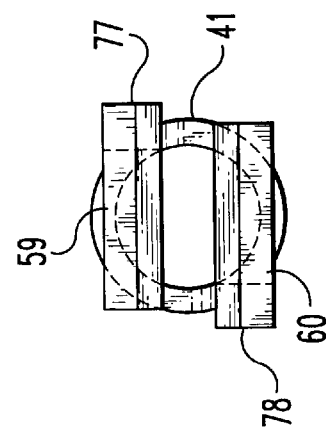
FIGS. 12, 13, and 14 are respectively end, side, and top view of one embodiment of the present invention.
Figure 14:
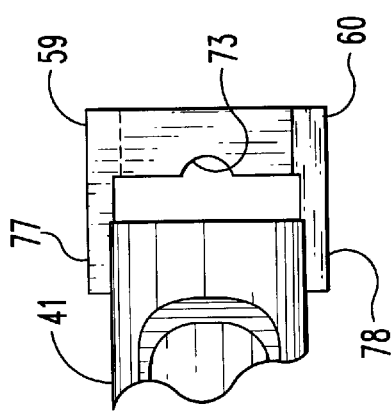
Figure 13:
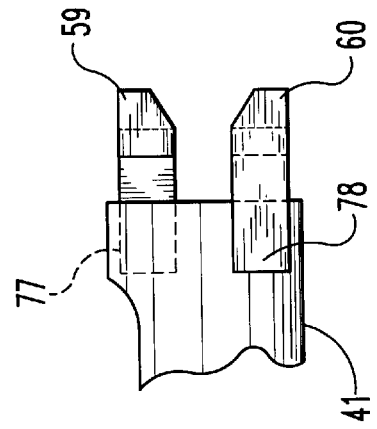

Referring now to FIGS. 12, 13, and 14 there is shown an alternative embodiment to attaching fingers 59 and 60 to rigid hollow cylinder 41. In previous figures, fingers 59 and 60 were presented contiguous to rigid hollow cylinder 41; that is, fingers 59 and 60 were shown cut or molded into the same piece of material as cylinder 41. Alternatively, fingers 59 and 60 may start as separate pieces and then be attached to rigid hollow cylinder 41 in any conventional manner such as welding legs 77 and 78, which are attached to fingers 59 and 60, to opposite sides of cylinder 41.

Figure 15:
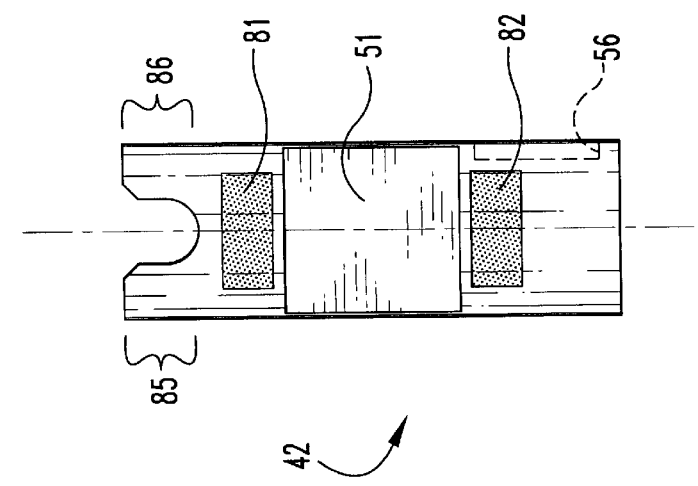
Figure 18:
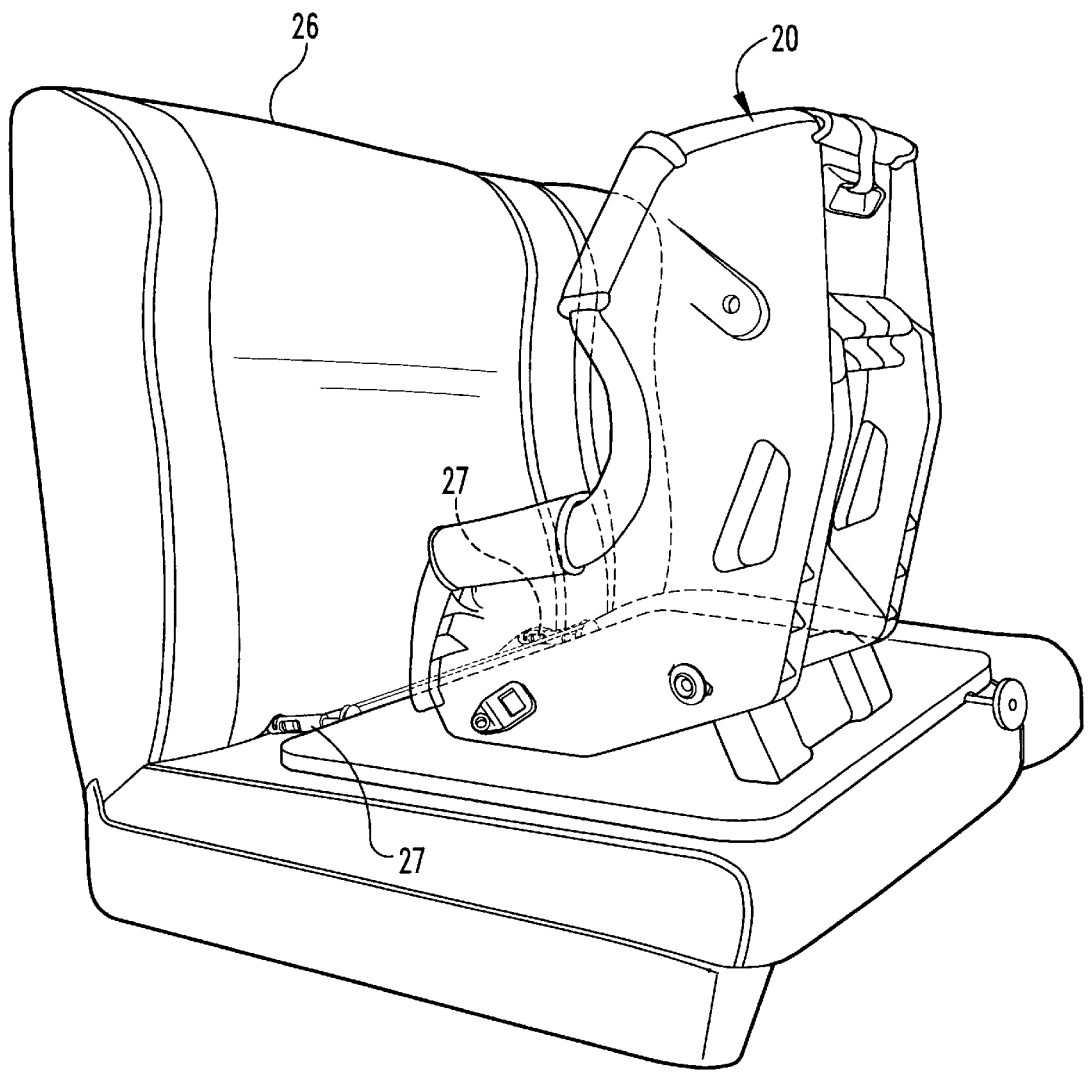
FIG. 18 is a perspective view of a passenger seat and a rearwardly facing child seat incorporating one embodiment of the present invention.

A plan view of piston 42 is presented in FIG. 15. Piston 42 optionally includes an indicator to inform the user when the piston is either proximally or distally displaced within rigid hollow cylinder 41. The indicator is provided by colored portions 81 and 82 located on piston 42. When proximally displaced, colored portion 81 is readily visible through access opening 54 and colored portion 82 is hidden under rigid hollow cylinder 41. Then when piston 42 is distally displaced, colored portion 82 becomes readily visible, and colored portion 81 becomes hidden. In this regard, it is contemplated that colored portions 81 and 82 have different colors to allow the user to know at a glance what position piston 42 resides.

Figure 17:
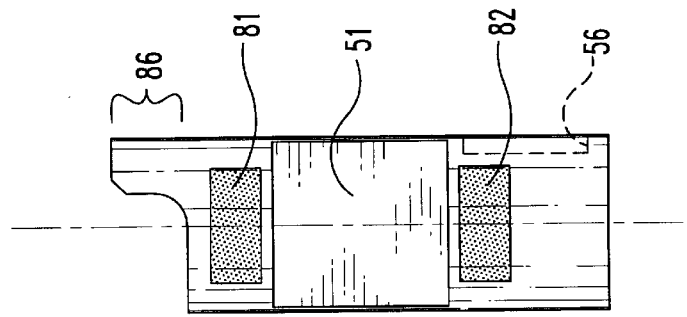
FIGS. 15, 16, and 17 are plan views of alternative embodiments of a piston that may be used in a rotary coupling according to the present invention.
Figure 16:
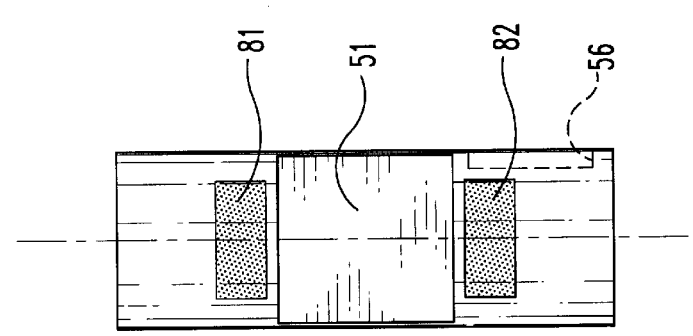

Still referring to FIG. 15, piston 42 optionally includes two pawl blocks, 85 and 86. Pawl blocks 85 and 86 are extensions of piston 42 forming a groove to contact rigid member 35. When coupling 27 is rotated, as described more fully below, member 35 is positioned within slots 102 and 103, and the groove contacts rigid member 35. With rotary coupling 27 and rigid member 35 thusly engaged, pawl blocks 85 and 86 reside on either side of member 35 and prevent member 35 from sliding out of either notch 66 or 67. FIG. 16 shows an alternative embodiment of the piston 42 that omits the pawl blocks, and FIG. 17 presents yet another alternative embodiment where only one pawl block, 86, is present.

Rotary coupling 27 is engaged to rigid member 35 by first placing rigid member 35 between fingers 59 and 60 and then pushing rotary coupling 27 against rigid member 35 until rigid member 35 becomes aligned with slots 102 and 103 of notches 66 and 67. This movement pushes piston 42 to a proximal position inside cylinder 41 and compresses spring 43. Once rigid member 35 is aligned with slots 102 and 103 of notches 66 and 67, the rotary coupling is twisted about its axis to place fixedly mounted rigid member 35 within slots 102 and 103 and then the coupling is released. With the coupling released, spring 43 decompresses and presses piston 42 against rigid member 35, which holds rigid member 35 within rotary coupling 27.

Rotary coupling 27 is then released from rigid member 35 by first accessing piston 42 through access opening 54 with a human finger. Once the human finger is located at groove 51, piston 42 can be pulled back to a proximal position within cylinder 41. With piston 42 located in a proximal position, spring 43 is recompressed and the spring's force against rigid member 35 is released. With the force released, rotary coupling 27 is then twisted around its longitudinal axis in a direction that is opposite of that which was previously used to engage coupling 27 and member 35. Rotary coupling 27 is then twisted until rigid member 35 exits slots 102 and 103 and is aligned with slots 100 and 101. Rigid member 35 is then slid past fingers 59 and 60, and out of out of rotary coupling 27.

Figure 19:
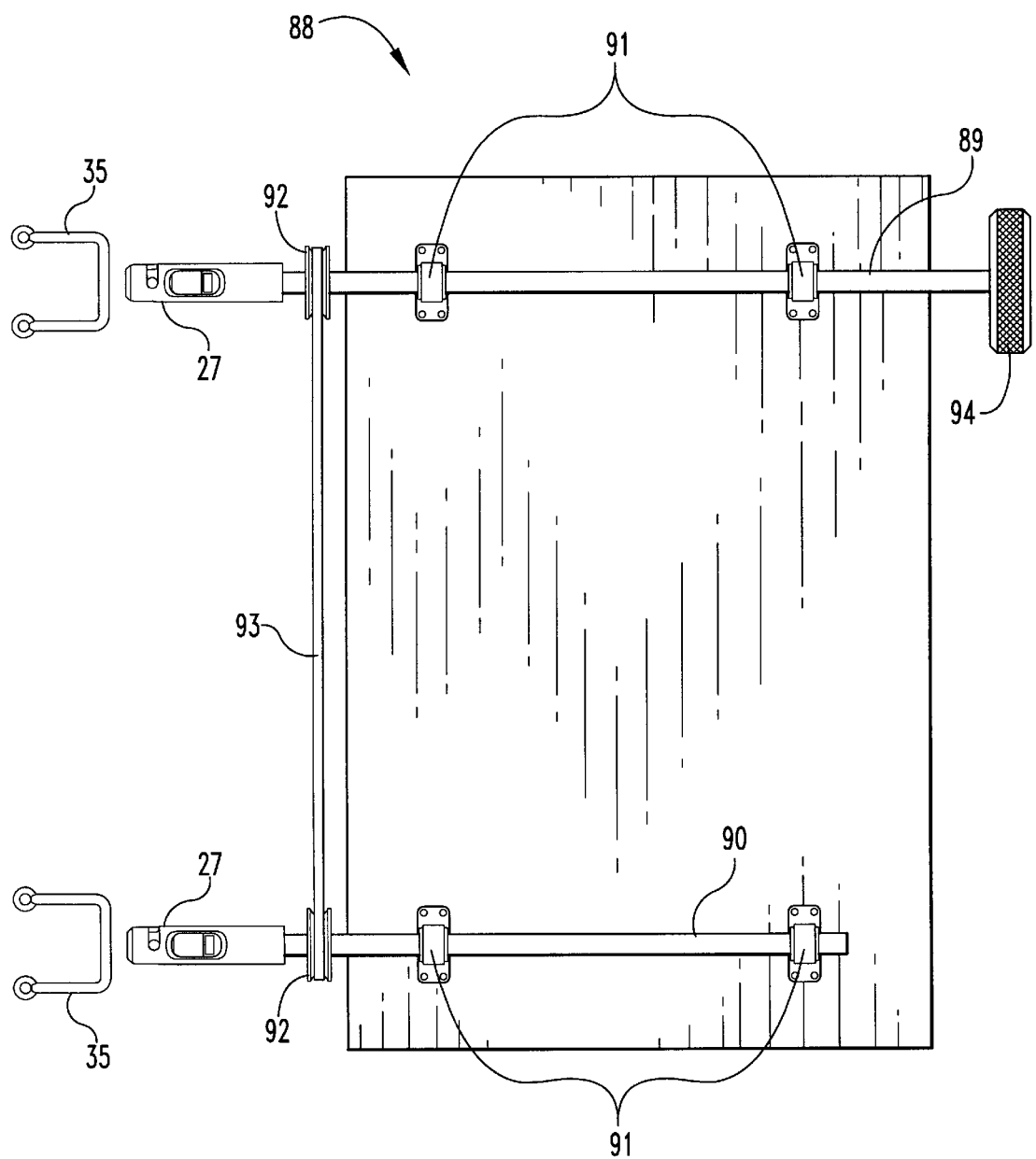
FIG. 19 is a plan view of a rigid plate according to one embodiment of the present invention.

Referring to FIG. 19, another embodiment of this invention is presented with infant seat 20 mounted in most any conventional manner atop rigid platform 88. The platform, rather than the seat, is then attached to passenger seat 26 by rotary couplings 27. Referring to FIG. 19, rigid platform 88 has two shafts, 89 and 90, which are rotatably attached through bearings 91 to platform 88. Shafts 89 and 90 each include a pulley or gear 92 that are mutually connected by a belt or chain 93. A rotary coupling, 27, is then mounted to the distal end of each shaft. Arranged in this fashion, both couplings can then be simultaneously twisted around their longitudinal axis by turning knob 94.

This latter embodiment is operated by aligning each rotary coupling 27 with a rigid member 35 that was previously mounted in the bite of a passenger seat. Each rigid member is then pushed between the fingers in each rotary coupling, which simultaneously pushes each piston 42 to a proximal position inside the coupling. The rigid members are pushed past the fingers; until each rigid member aligns with the notches in its rotary coupling. Then once aligned, both rotary couplings are simultaneously twisted around each rigid member 35 by turning knob 94. Piston 42 and spring 43 in each rotary coupling then hold each rigid member 35 within notches 66 and 67, which in turn, securely holds the infant seat in the passenger seat of a vehicle. Optionally, belt 93 and pulleys 92 can be omitted from this embodiment and each shaft can be operated by a separate knob.

Figure 20:
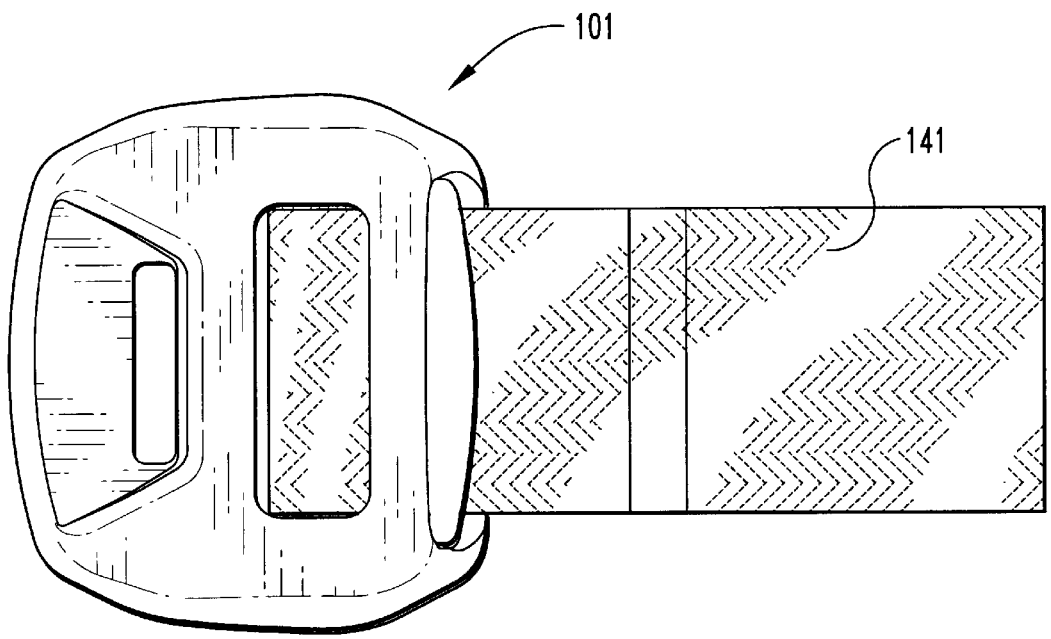
FIGS. 20–22 are respectively top, side, and cross-sectional views of a web adjuster according to one embodiment of the present invention.
Figure 21:
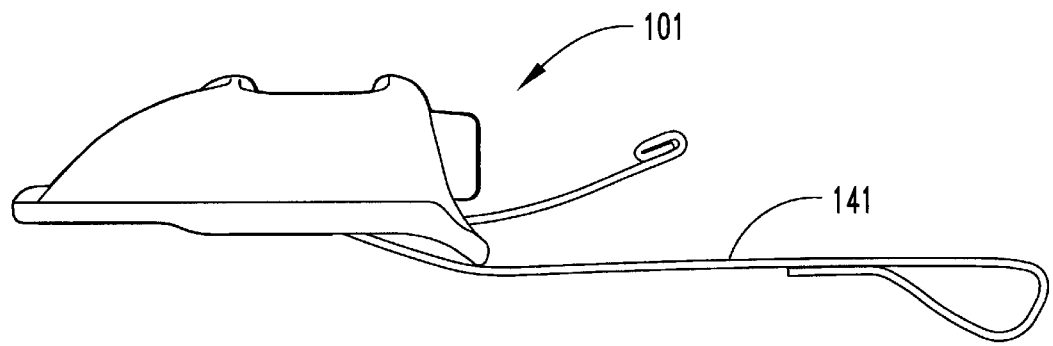
Figure 22:
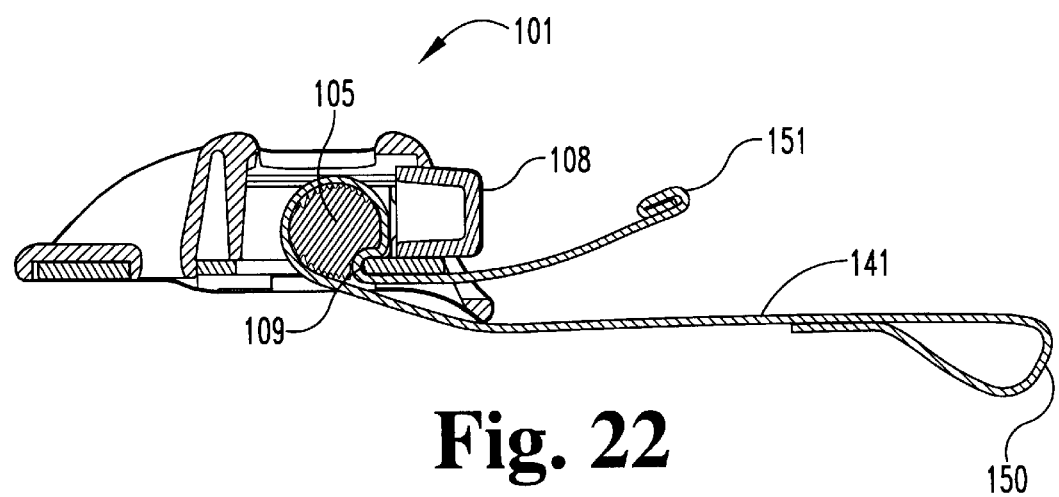
Figure 23:
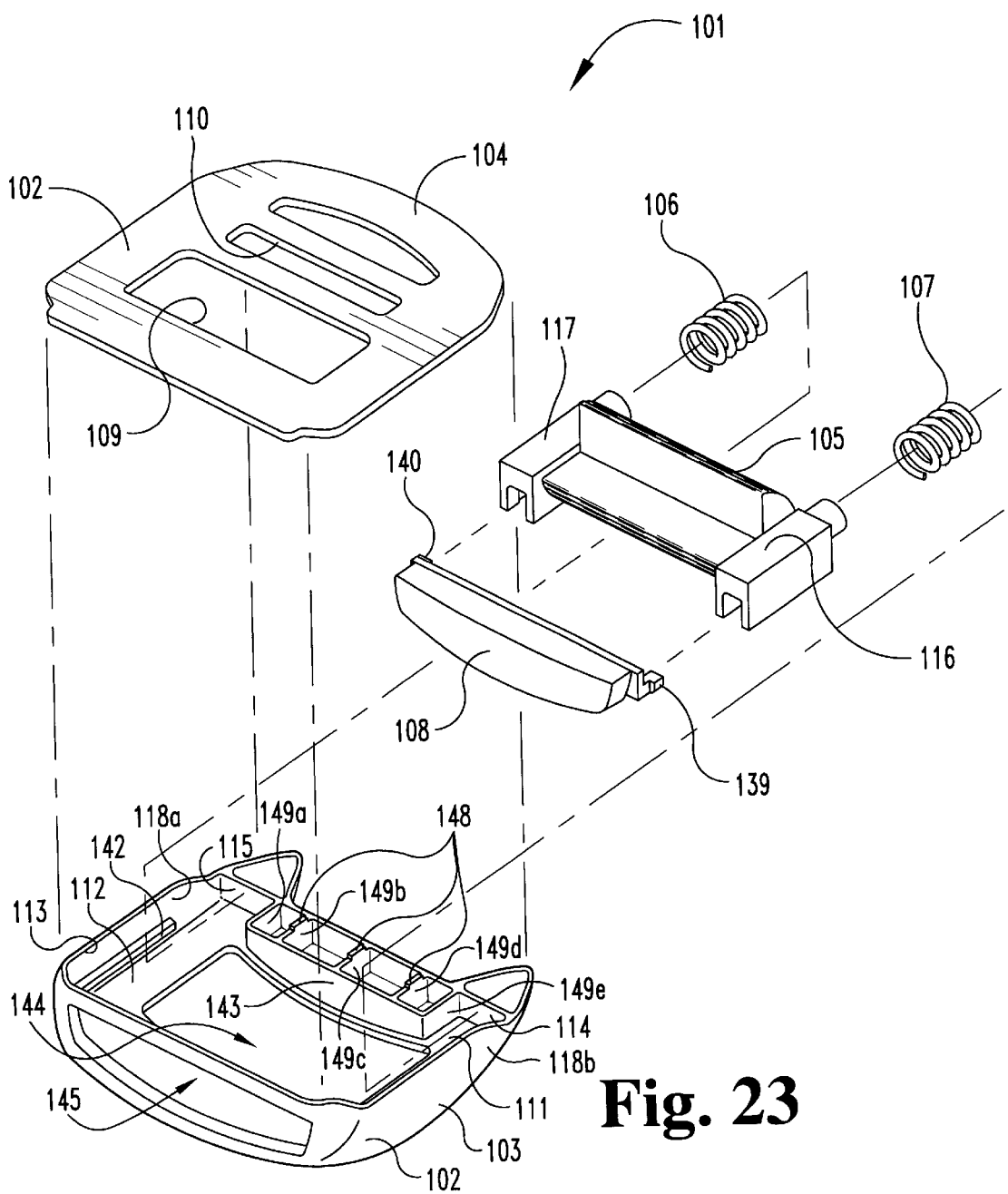
FIG. 23 is an exploded view of a web adjuster according to one embodiment of the present invention.
Figure 24:
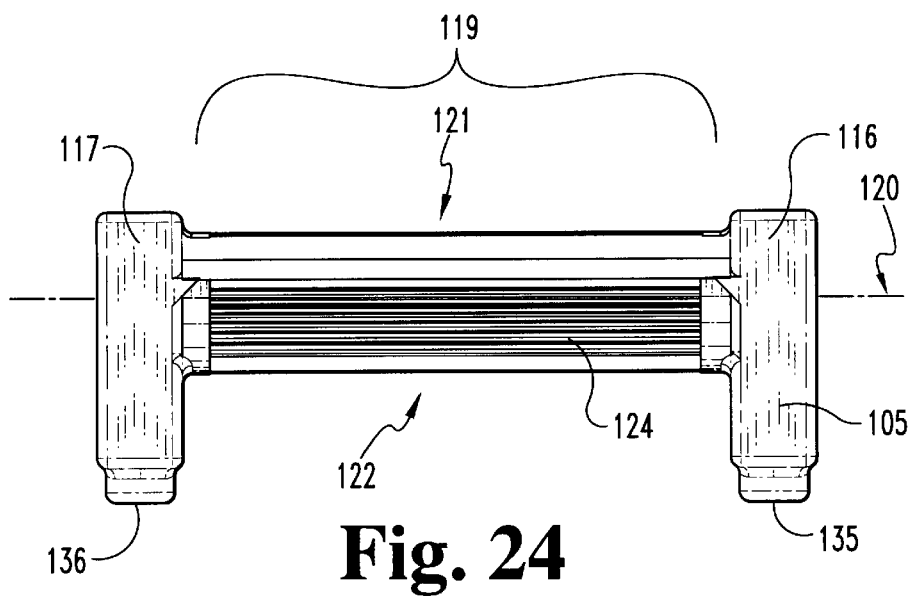
FIGS. 24–28 are respectively bottom, back, top, cross-sectional, and perspective views of a web gripping bar according to one embodiment of the present invention.
Figure 25:
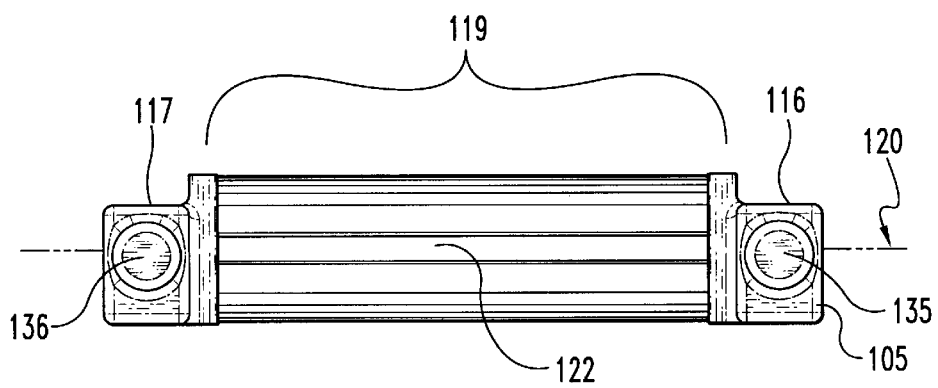
Figure 26:
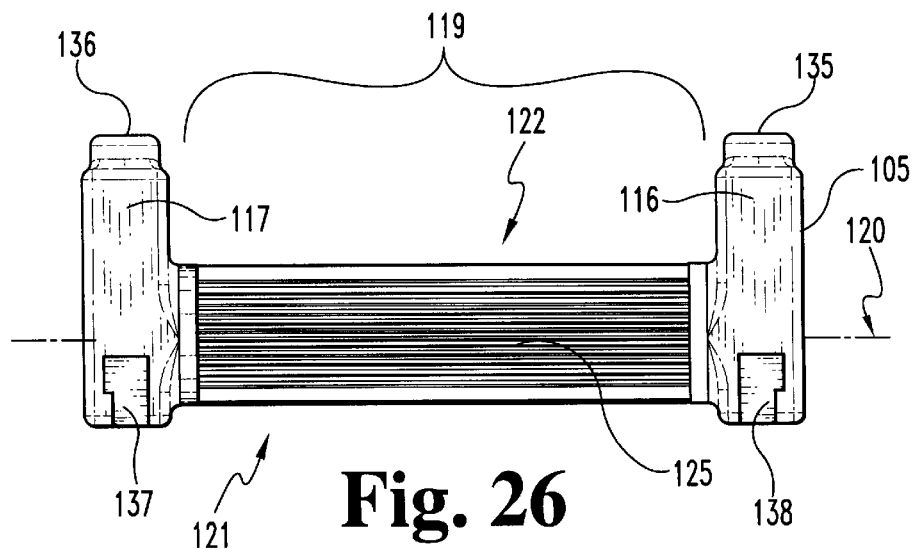

In addition to the conventional web adjusters, 31 and 32, shown in FIG. 1, one may also utilize web adjuster 101, shown in FIGS. 20–22 in this invention. Referring now more particularly to FIG. 23, there is shown an exploded view of web adjuster 101. Web adjuster 101 includes a bar 105, two springs 106 & 107, a button 108, a frame 102; which may be conceptually subdivided into housing 103 and plate 104; and a web 141, previously depicted in FIGS. 20–22.

Figure 28:
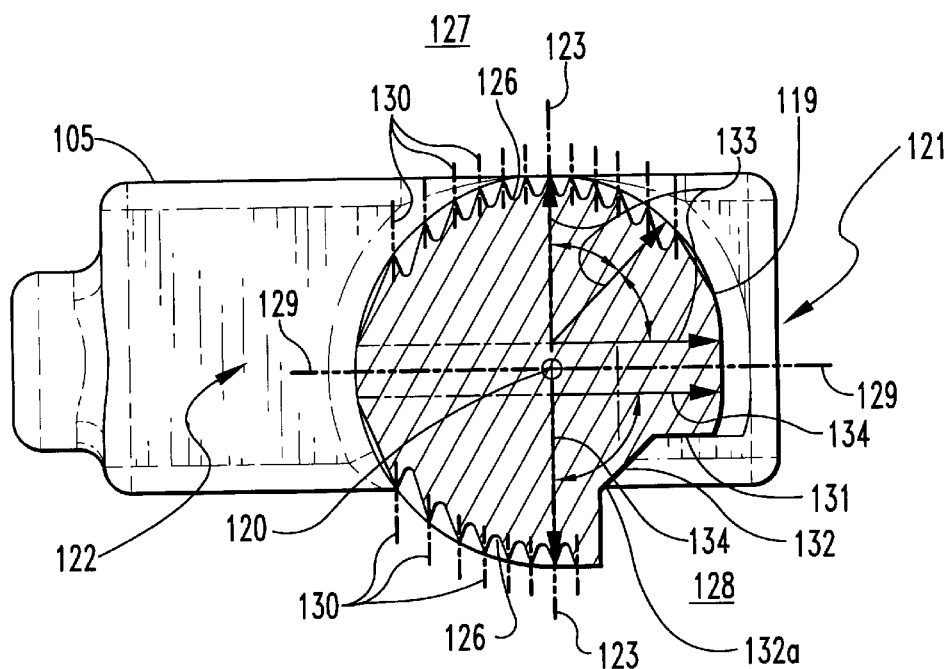
Figure 27:
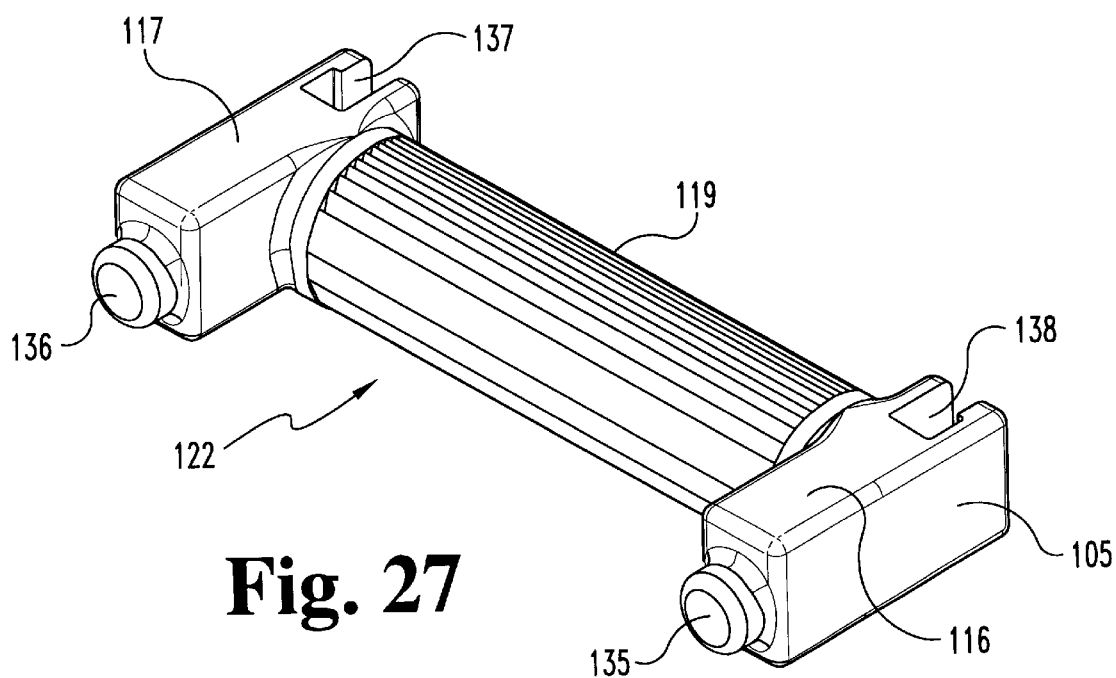
Figure 30:
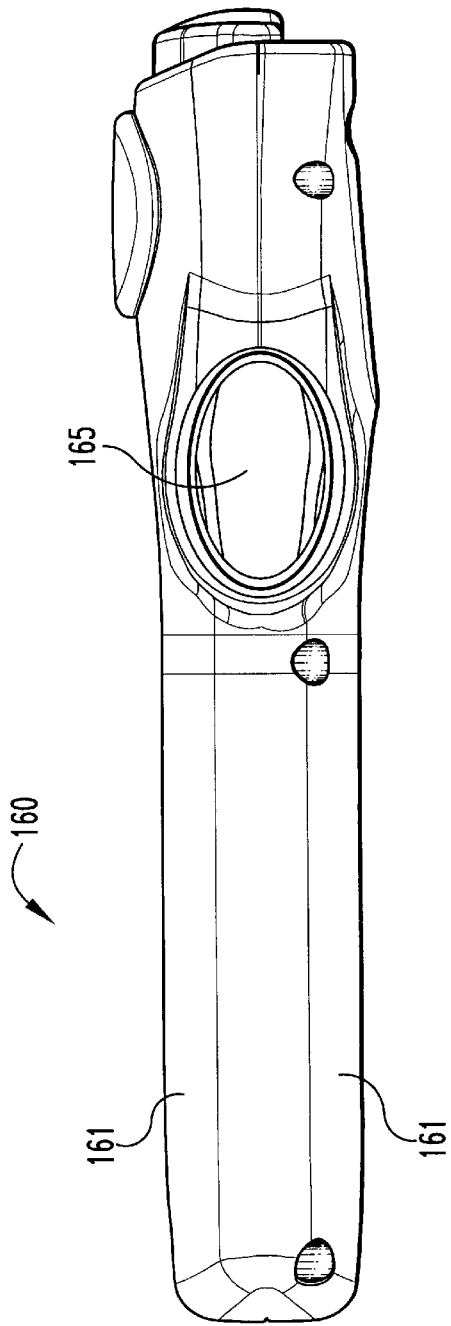

Details of bar 105 are shown in FIGS. 24–28. Bar 105 may be characterized as having a generally cylindrical body 119 with a longitudinal axis 120, a front face 121, a back face 122, and a frontal plane 123 (FIG. 28). Frontal plane 123 is important to convey the preferred placement of serrated portions 124 and 125. Referring to FIG. 28, each of these serrated portions is formed by cutting or molding grooves 126 in the top 127 or bottom 128 of cylindrical body 119. But notably, these grooves are preferably placed on top 127 or bottom 128 in planes 130 that are parallel with frontal plane 123 (or perpendicular to median plane 129), instead of placing the grooves in planes that share longitudinal axis 120. Wear on the web is generally reduced when grooves 126 are placed parallel with frontal plane 123. The front face 121 of cylindrical body 119 also preferably includes a longitudinal notch 131. Longitudinal notch 131 is placed in front face 121 so as to butt against web stop 109 on plate 104, and preferably includes bevel 132 to assist bar 105 in seating against web 141 and web stop 109. In this most preferred embodiment, web 141 is held between point 132a on bevel 132 and the top edge of web stop 109 on plate 104. Still further, front face 121 is preferably slightly thinner in cross-section than back face 122. For example, shortened radii 133 and 134 are preferably continued around front face 121 until they are parallel with median plane 129 to give central body 119 a generally elliptical cross-section. The longitudinal axis 120 is contained in frontal plane 123, which contains the max uppermost point on the top 127 and the maximum lowermost point on the bottom 128. As viewed in FIG. 28, all radii defining the back. face 122 intersect longitudinal axis 120, and are greater than or equal to all radii defining front face 121.

Bar 105 also includes ears 116 & 117, which are mounted near each end of cylindrical body 119. As shown, these projections are preferably rectangular in shape, and extend away from the longitudinal axis of bar 105, from back face 122. Nonetheless, it is also contemplated that ears 116 & 117 may have other shapes and laterally extend from other sides of cylindrical body 119, such as from front face 121. Ears 116 & 117 provide torsional rigidity to bar 105 such that bar 105 will neither turn nor deform as force is applied to end 150 of web 141. Ears 116 & 117 preferably include tabs 135 & 136, as well as slots 137 & 138. Tabs 135 & 136 are sized to accept an end of springs 106 & 107, and slots 137 & 138 are sized to accept interlocking tabs 139 & 140 on button 108 (FIG. 23).

Housing 103 is generally concave in shape, the bottom/ opening of which is shown in FIG. 23. Housing 103 contains two channels 111 & 112, which are largely defined by walls 118a & 118b and ear guides 142, which are included along the inside of housing 103. A backstop 143 is then preferably included inside housing 103 between the ends 114 & 115 of channels 111 & 112. Backstop 143 is preferably supported by walls 149a–e. Beyond the foregoing structures, housing 103 preferably also includes access opening 144, which exposes the top of bar 105 and button opening 145 to provide access to front face 121 of bar 105.

With housing 103 formed in this fashion, web adjuster 101 is initially assembled by placing button 108 inside button opening 145. Bar 105 then rests inside housing 105 with ears 116 & 117 sliding in channels 111 & 112, between ear guides 142 (one ear guide on each side of bar 105). As shown, bar 105 is oriented in these channels such that tabs 135 & 136 face channel ends 114 & 115, such that the longitudinal notch 131 faces plate 104 (discussed below), and such that slots 137 & 138 engage interlocking tabs 139 & 140 on button 108. Helical springs 106 & 107 are then inserted inside channels 111 & 112 between channel ends 114 & 115 and tabs 135 & 136. The assembly of web adjuster 101 may then be completed by wrapping web 141 around bar 105 as shown in FIG. 22 and by covering the bottom of housing 103 with plate 104. Plate 104 is preferably made of metal and shaped to fit inside the edges 113 of the walls 118a & b of housing 103. Plate 104 has a web stop 109 (FIGS. 22 & 23), which mates against web 141 and longitudinal notch 131 on bar 105. Housing guide 110 then helps to insure that plate 104 remains in this position by receiving guide tabs 148 on walls 149b–d. Web adjuster 101 is then operated by pressing button 108, which releases the grip of bar 105 on web 141. With the grip released, end 150 of web 141 can be extended by pulling end 150 away from adjuster 101. End 151 can be extended whether button 108 is pushed or not by pulling end 151 away from adjuster 101.

Figure 1A:
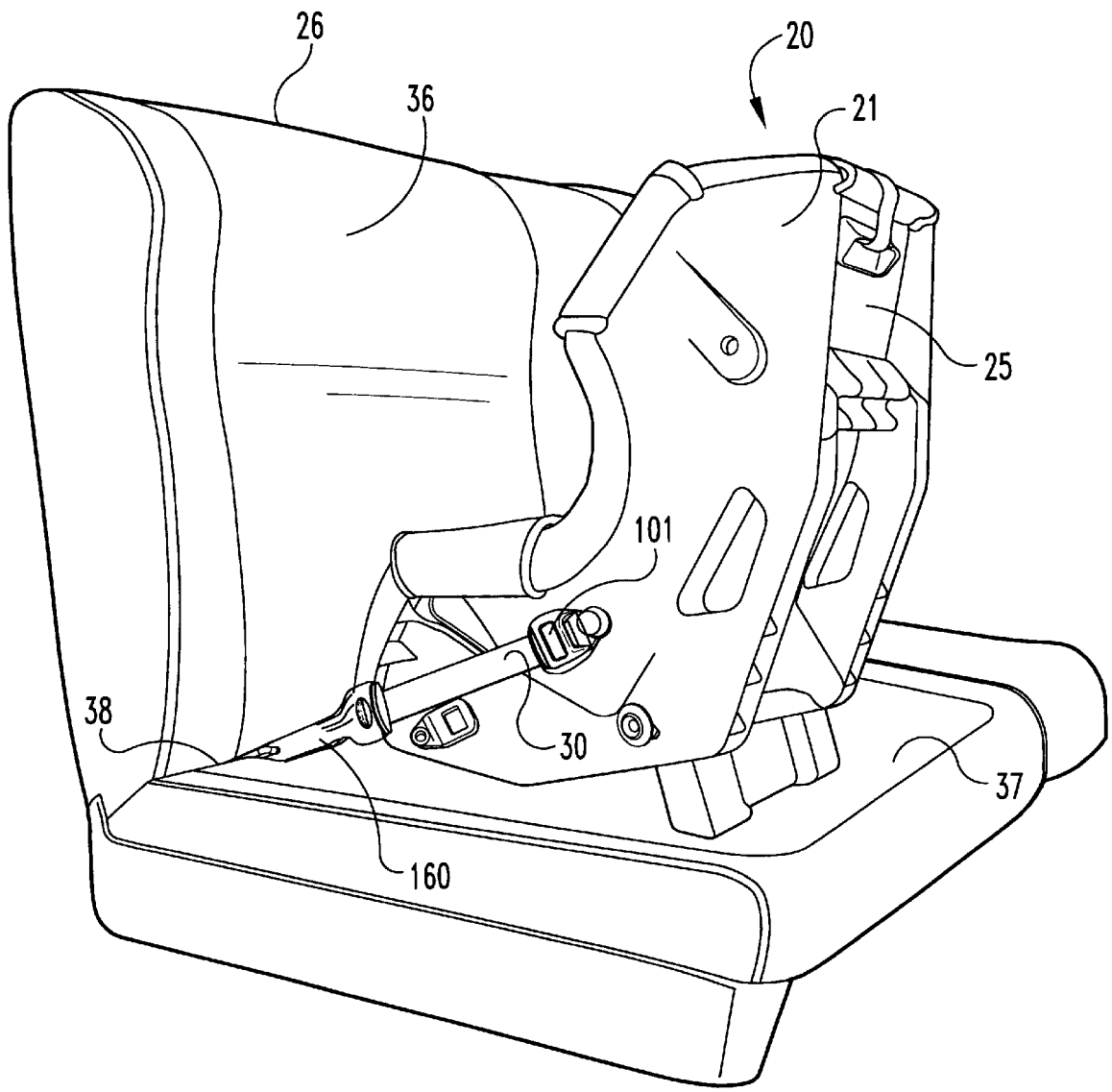
FIG. 1A is a perspective view of a passenger seat and a rearwardly facing child seat incorporating another embodiment of the present invention.
Figure 32:
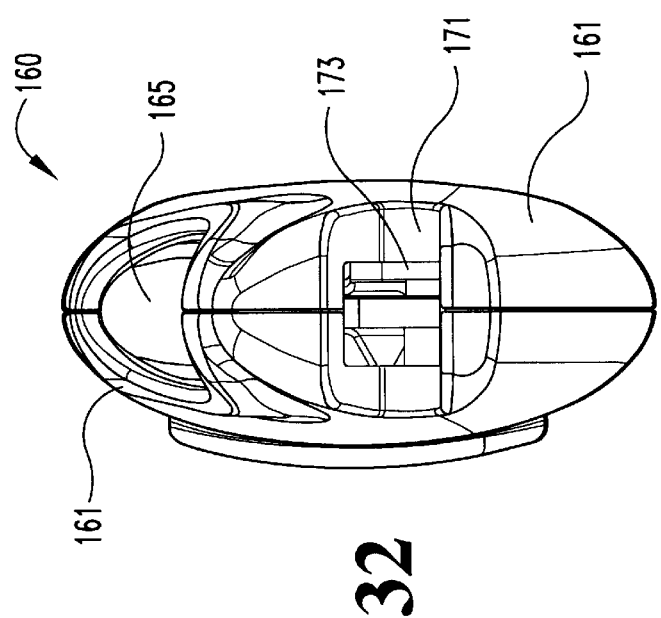
Figure 31:
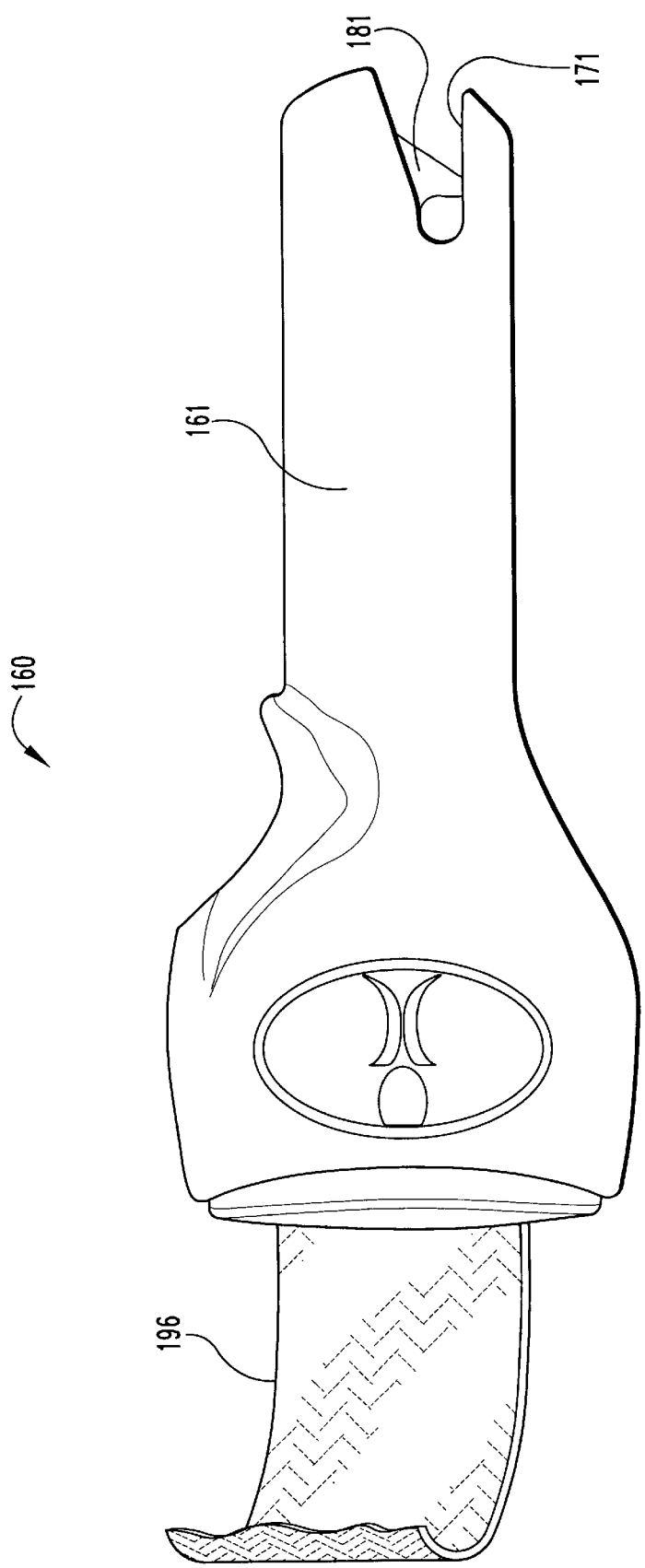

Referring to FIG. 1A, in yet another alternative embodiment of the present invention, connector 160 shown in FIG. 29 may be substituted for rotary coupling 27. Top, side, and front views of this device are respectively shown in FIGS. 31–33. Referring now more particularly to FIG. 33, there is shown an exploded view of part of connector 160. Connector 160 includes housing 161, a plate 162, a lever 163, a plate 164, button 165, spring 186 (FIGS. 34 & 35) and pins 166 & 167.

Housing 161 is preferably injection molded from plastic into a generally concave shape that is largely defined on each side by walls 168. Housing 161 has plugs 169 & 170 and guides 192, which mate with complementary structures on the other half of housing 161, which has been omitted from FIG. 33 for clarity. Both halves of housing 161 have retaining walls 172 to hold plates 162 or 164 inside housing 161, against the top of plugs 169 & 170. Finally, housing 161 has a notch 171, which is sized to allow a fixedly mounted rigid member (not shown) to be placed inside the mouth 173 of plates 162 & 163.

The plate 162 is preferably made of metal and is sized to fit inside the walls 168 and beneath retaining walls 172 of housing 161. As shown, first plate 162 is also preferably formed at 190 to fit around plugs 169 & 170. The intermediate portion 193 of first plate 162 has two holes 174 & 175, which upon assembly, receive the tapered ends 176 & 177 of preferably metal pins 166 & 167. The distal end 191 of first plate 162 has a mouth 173 that is sized to receive a fixedly mountable rigid member (not shown). But in this regard, mouth 173 is preferably formed wider toward its distal end than its proximal end to allow the user to more easily place a fixedly mounted rigid member into the bottom of mouth 173.

Lever 163 is preferably made of metal and is sized to move inside the housing of connector 160, between plates 162 & 164. Lever 163 contains a hole 178 to pivot on pin 167. In contrast, pin 166 only supports the body 179 of lever 163 when connector 160 is left in the normally closed position. The distal end 180 of lever 163 has a downward projecting finger or tooth 181. Tooth 181 is preferably of a length to cover the distal opening of mouth 173 when connector 160 is resting in a normally closed position. The proximal end 182 of lever 163 has a button engagement surface 183 to ride against the bottom of button 165, button 165 being located in opening 184 of housing 161, directly above button engagement surface 183. Finally, lever 163 also has a projection 185, which upon assembly is sized to accept the end of spring 186 (FIGS. 34 and 35) to hold spring 186 in position against lever 163.

Plate 164 is also preferably made of metal and resides next to lever 163. Complementary to the profile of plate 162, plate 164 also contains holes 187 & 188 that are sized to receive the opposite tapered ends (omitted for clarity) of pin 166 and 167, and a mouth 173 that is sized to receive a fixedly mountable rigid member. Plate 164 is sized to fit inside housing 161, and again similar to plate 162 is also formed at 195 to fit around the plugs that attach to 169 & 170. The proximal end 194 of plate 164 is discussed below.

Figure 34:
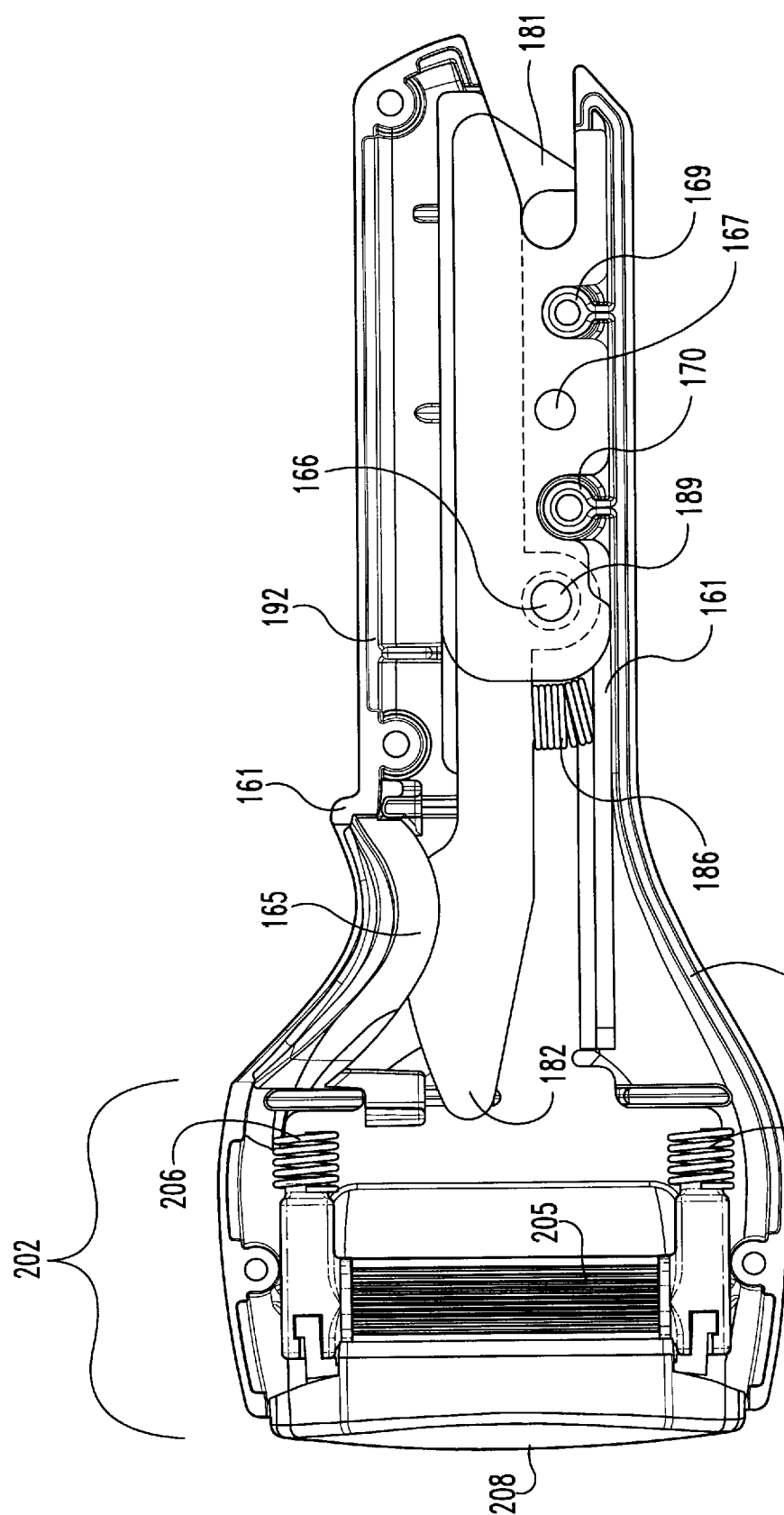
FIG. 34 is a side cross-sectional view of a connector in a closed position according to one embodiment of the present invention.
Figure 35:
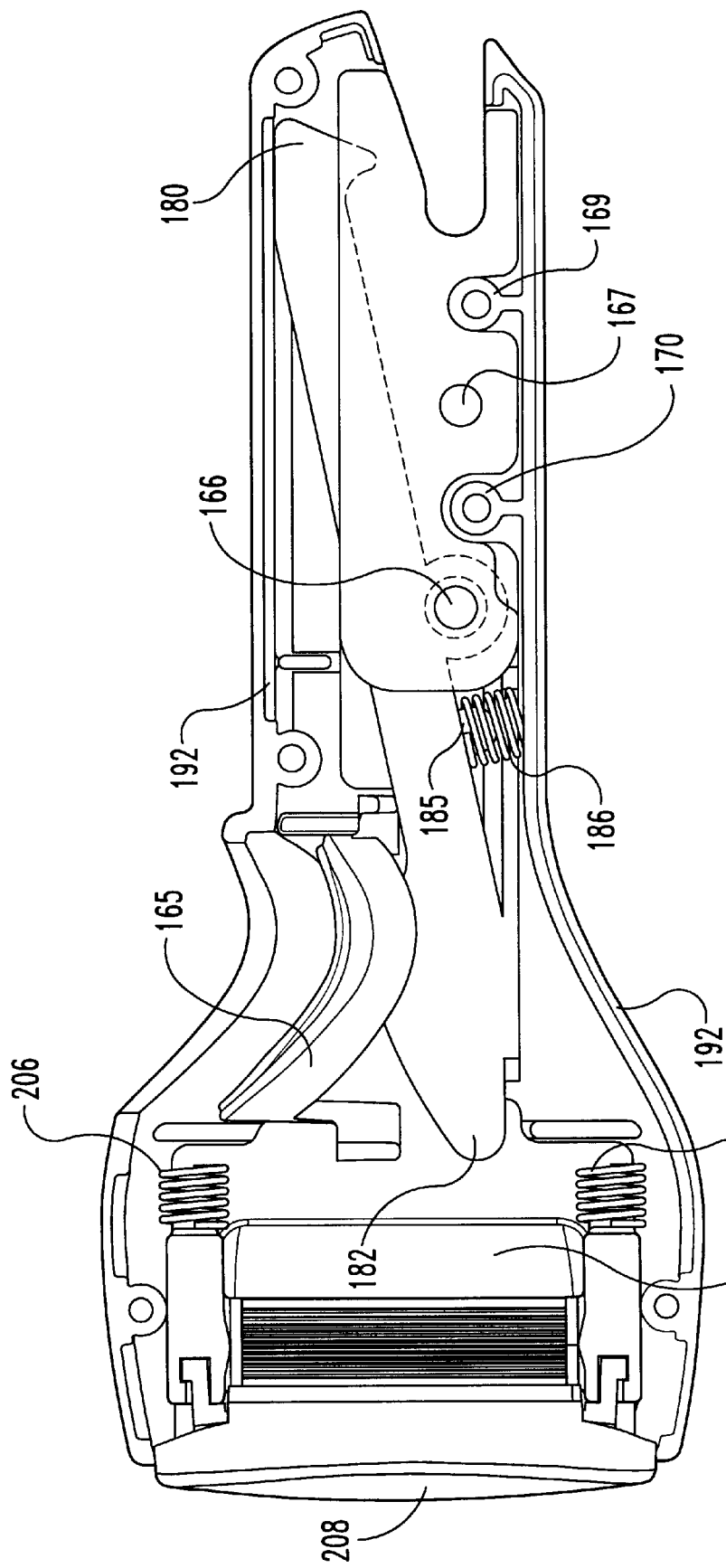
FIG. 35 is a side cross-sectional view of a connector in an open position according to one embodiment of the present invention.

Assembled in this fashion, connector 160 has a normally closed position shown in FIG. 34 and an open position shown in FIG. 35. In the closed position, spring 186 pushes against housing 161 and lever 163 at projection 185, at a location that is proximal to pivot point 189. Thusly extended, spring 186 urges button 165 up against housing 161 and simultaneously holds finger 181 on lever 163 in mouth 172 between plates 162 & 164 to cover mouth 172 and close connector 160. Connector 160 is opened by pushing downward on button 165 and compressing spring 186, which in turn, lifts distal end 180 and pulls finger 181 out of mouth 172. With lever 163 relocated in this manner, mouth 172 is ready to receive a fixedly mountable rigid member.

Like previously discussed rotary coupling 27, the distal end of web 196 (FIG. 31) can be attached to the proximal end of connector 160 in any conventional manner, such as with pins, rivets, stitching, or a conventional web adjuster. But in this regard, it is also contemplated that both rotary coupling 27 and connector 160 may incorporate web adjuster 101 as an integral part of the connector. The method to attach web adjuster 101 to either rotary coupling 27 or connector 160 is well within the average skill of this art. Be that as it may, FIGS. 29–36 depict such an integration and the following description is provided for the convenience of the reader.

Figure 36:
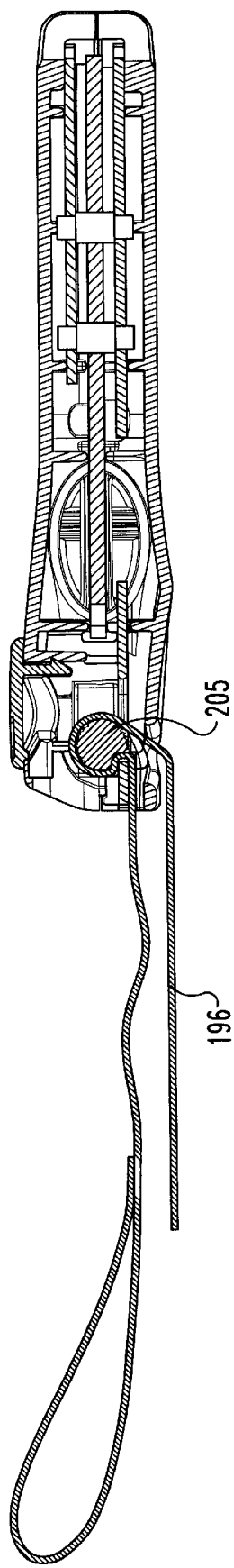
FIG. 36 is a top cross-sectional view of a connector according to one embodiment of the present invention.
Figure 37:
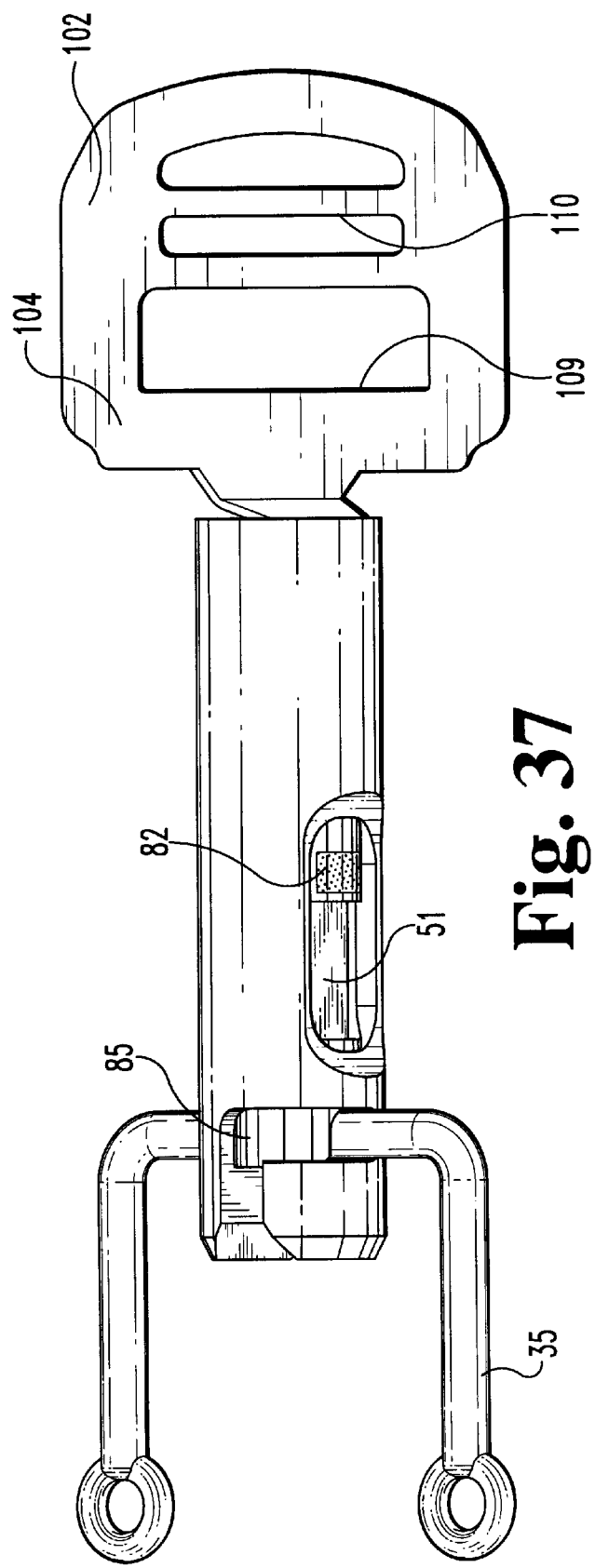
FIG. 37 is a top view of a rotary coupling incorporating a web adjuster according to one embodiment of the present invention.

Referring again to FIGS. 33–35, there is shown an exploded view of web adjuster 201 that is integrated or attached to connector 160. Like web adjuster 101, web adjuster 201 includes a bar 205, two springs 206 & 207 (FIG. 35), a button 208, a frame 202; which may be conceptually subdivided into housing 203 and plate 204; and a web 196 (FIG. 36). Bar 205, and springs 206 & 207 are preferably identical to the previously described bar 105 and springs 106 & 107, and web 196 is wound around bar 205 similarly as web 141 is wound around bar 105. Housing 203 is largely identical to previously described housing 103 except that it is now an integral part or a continuation of housing 161 and includes a cover 197 to cover access opening 144. Finally, plate 204 is largely similar to previously described plate 104 with a web stop 209 to grip web 196 just as web stop 109 gripped web 141. But by also being a continuous part of plate 164, plate 204/plate 164 provides a mechanical connection between a fixedly mountable rigid member (not shown) and web 196. Connector 160 or the rotary coupling of FIG. 37 may be integrally connected to a web adjuster such as web adjuster 101.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A child restraining device for mounting in the passenger seat of a vehicle having at least one fixedly mounted rigid member, comprising:
    a child seat having a seat support upon which the child may sit and back support against which the child may rest;
    at least one coupling, said coupling including:
        (a) a frame, said frame having a proximal end and a distal end, the distal end of said frame having a notch with a mouth and a seat that is adapted to receive the fixedly mounted rigid member;
        (b) a lever with a finger mounted on its distal end; said lever pivotally mounted on said frame with the distal end of said lever extending beyond the seat of the notch in said flame;
            wherein said lever has a closed position wherein said finger substantially covers the mouth of said notch and an open position wherein said finger is substantially removed from the mouth of said notch;
        (c) means for biasing said lever toward the closed position;
        (d) means for securing said coupling to said child seat;
            whereby the coupling of the child restraining device may be releasably engaged with the fixedly mounted rigid member of the passenger seat of a vehicle by (i) pushing the fixedly mounted rigid member into the notch in the frame of said coupling, (ii) moving the lever in an open position until the fixedly mounted rigid member is proximal to the finger on said lever, and (iii) allowing said lever to return to its closed position;
        (e) a button operatively connected to the proximal end of said lever, whereby pushing said button, said finger is substantially lifted out of the mouth of said notch; and
        (f) said frame also including a housing and two stationary plates mounted inside said housing on ieach side of said lever.

2. The child restraining device of claim 1, wherein at least one of said plates includes a mouth that is adapted to receive the fixedly mounted rigid member.

3. The child restraining device of claim 1, wherein the means for biasing is a helical spring mounted between said frame and the proximal end of said lever.

4. A child restraining device for mounting in the passenger seat of a vehicle having at least one fixedly mounted rigid member, comprising:
    a child seat having a seat support upon which the child may sit and back support against which the child may rest;
    at least one coupling, said coupling including:
        (a) a frame, said frame having a proximal end and a distal end, the distal end of said frame having a notch with a mouth and a seat that is adapted to receive the fixedly mounted rigid member;
        (b) a lever with a finger mounted on its distal end; said lever pivotally mounted on said frame with the distal end of said lever extending beyond the seat of the notch in said frame;
            wherein said lever has a closed position wherein said finger substantially covers the mouth of said notch and an open position wherein said finger is substantially removed from the mouth of said notch;
        (c) means for biasing said lever toward the closed position; and
        (d) means for securing said coupling to said child seat;
            whereby the coupling of the child restraining device May be releasably engaged with the fixedly mounted rigid member of the passenger seat of a vehicle by (i) pushing the fixedly mounted rigid member into the notch in the frame of said coupling, (ii) moving the lever in an open position until the fixedly mounted rigid member is proximal to the finger on said lever, and (iii) allowing said lever to return to its closed position;
            wherein the means for securing said coupling to said child seat includes a web adjuster, said web adjuster further comprising:
                a bar with a frontal plane, a longitudinal axis, a front face, and a back face, said bar including a pair of ears mounted near the opposite ends of said bar, said ears further mounted crosswise to the longitudinal axis of said bar;
                a web extending at least partially around said bar;
                a frame with a pair of channels with the ears of said bar slidably mounted in said channels, said frame also including a web stop extending parallel to said bar; and
                means for urging the front face of said bar against said web and toward said web stop.

5. The child restraining device of claim 4, wherein said bar includes a serrated surface, said serrated surface including a plurality of longitudinal grooves that reside in planes that are substantially parallel to the frontal plane of said bar.

6. The child restraining device of claim 4, wherein said bar further includes a longitudinal notch, said notch adapted to mate against the web stop on said frame.

7. The child restraining device of claim 4, wherein said bar further includes a longitudinal notch and the notch is beveled to mate against the web stop on said frame.

8. The child restraining device of claim 4, wherein the cross-section of said cylindrical bar is generally elliptical.

9. The child restraining device of claim 4, wherein the cross-section of said cylindrical bar is generally round.

10. The child restraining device of claim 4, wherein the frame of said coupling is contiguous with the frame of said web adjuster.

11. A child restraining device for mounting in the passenger seat of a vehicle having at least one fixedly mounted rigid member, comprising:
    a child seat having a seat support upon which the child may sit and back support against which the child may rest;
    at least one rotary coupling, said rotary coupling including:
        (a) a rigid hollow cylinder having a first open end, a second end, an access opening, and a longitudinal axis;
        (b) two laterally and oppositely disposed fingers, each finger fixedly attached to the first open end of said cylinder and forming a notch between the proximal edge of the finger and the first open end of said rigid hollow cylinder;

(c) a piston reciprocally and slidably received within said rigid hollow cylinder between a proximal position away from said fingers and a distal position toward said fingers, said piston having an external end;

(d) means for biasing said piston toward the distal position; and (e) means for preventing said piston from sliding past the distal position; and means for securing said rotary coupling to said child seat; said means for securing including a web adjuster, said web adjuster including:

(f) a bar with a frontal plane, a longitudinal axis, a front face, and a back face, said bar further including a pair of ears mounted near the opposite ends of said bar, said ears further mounted crosswise to the longitudinal axis of said bar;

(g) a web extending at least partially around said bar;

(h) a frame with a pair of channels with the ears of said bar slidably mounted in said channels, said frame also including a web stop extending parallel to said bar; and (i) means for urging the front face of said bar against said web and toward said web stop;

whereby the rotary coupling of the child restraining device may be releasably engaged with the fixedly mounted rigid member of the passenger seat of a vehicle by pushing the fixedly mounted rigid member between the fingers of said rotary coupling, by sliding the piston of said rotary coupling toward the proximal position until the fixedly mounted rigid member is aligned with the notches in said rotary coupling, and by twisting said rotary coupling around its longitudinal axis to place the fixedly mounted rigid member within the notches of said rotary coupling.

12. The child restraining device of claim 11, wherein said bar of said web adjuster includes a serrated surface, said serrated surface including a plurality of longitudinal grooves that reside in planes that are substantially parallel to the frontal plane of said bar.

13. The child restraining device of claim 11, wherein said bar of said web adjuster further includes a longitudinal notch, said notch adapted to mate against the web stop on said frame.

14. The child restraining device of claim 11, wherein said bar of said web adjuster further includes a longitudinal notch and the notch is beveled to mate against the web stop on said frame.

15. The child restraining device of claim 11, wherein the cross-section of said cylindrical bar of said web adjuster is generally elliptical.

16. The child restraining device of claim 11, wherein the cross-section of said cylindrical bar of said web adjuster is generally round.

17. The child restraining device of claim 11, wherein the frame of said coupling is contiguous with the frame of said web adjuster.

* * * * *